United States Patent
Willars et al.

(10) Patent No.: US 9,107,197 B2
(45) Date of Patent: Aug. 11, 2015

(54) TERMINAL-BASED SELECTION OF RADIO PARAMETERS AMONG A PARAMETER SUBSET OFFERED BY THE NETWORK

(75) Inventors: Per Willars, Vaxholm (SE); Riikka Susitaival, Helsinki (FI); Henning Wiemann, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 400 days.

(21) Appl. No.: 13/209,796

(22) Filed: Aug. 15, 2011

(65) Prior Publication Data
US 2012/0263051 A1    Oct. 18, 2012

Related U.S. Application Data

(60) Provisional application No. 61/475,077, filed on Apr. 13, 2011.

(51) Int. Cl.
H04W 76/00    (2009.01)
H04W 76/04    (2009.01)

(52) U.S. Cl.
CPC ..................... *H04W 76/04* (2013.01)

(58) Field of Classification Search
None
See application file for complete search history.

(56) References Cited

U.S. PATENT DOCUMENTS

| | | | |
|---|---|---|---|
| 6,434,389 B1 * | 8/2002 | Meskanen et al. | 455/437 |
| 2004/0045012 A1 * | 3/2004 | Doraisamy | 719/321 |
| 2004/0266450 A1 | 12/2004 | Chowdhury | |
| 2007/0276441 A1 * | 11/2007 | Goetz | 607/2 |
| 2008/0259849 A1 * | 10/2008 | Connors et al. | 370/328 |
| 2009/0316654 A1 * | 12/2009 | Prakash et al. | 370/331 |
| 2010/0054237 A1 * | 3/2010 | Han et al. | 370/350 |
| 2011/0191451 A1 * | 8/2011 | Kuo et al. | 709/220 |
| 2012/0100865 A1 * | 4/2012 | Jun et al. | 455/450 |
| 2012/0164950 A1 * | 6/2012 | Nentwig | 455/63.1 |
| 2013/0010631 A1 * | 1/2013 | Jung et al. | 370/252 |

OTHER PUBLICATIONS

International Search Report issued in Application No. PCT/SE2012/050113 dated May 2, 2012.
Written Opinion issued in Application No. PCT/SE2012/050113 dated May 2, 2012.
3GPP TS 36.331, "$3^{rd}$ Generation Partnership Project; Technical Specification Group Radio Access Network; Evolved Universal Terrestrial Radio Access (E-UTRA); Radio Resource Control (RRC); Protocol Specification," V10.1.0 (Mar. 2011).

(Continued)

*Primary Examiner* — Chi H Pham
*Assistant Examiner* — Shick Hom
(74) *Attorney, Agent, or Firm* — Patent Portfolio Builders, PLLC

(57) ABSTRACT

A method of operating a telecommunications system (20) comprises a radio access network node (34) offering plural parameter configurations to a wireless terminal (30) over a radio interface (32) and the wireless terminal (30) choosing a preferred parameter configuration from among the plural parameter configurations offered by the radio access network node. In an example embodiment and mode, the method further comprises the radio access network node (34) offering the plural parameter configurations as a list of discontinuous reception (DRX) configuration information elements, each discontinuous reception (DRX) configuration information element comprising one parameter value for each of the one or more corresponding discontinuous reception parameters defined for the configuration information element.

24 Claims, 13 Drawing Sheets

---

RADIO ACCESS NETWORK NODE OFFERING PLURAL PARAMETER CONFIGURATIONS TO A WIRELESS TERMINAL OVER A RADIO INTERFACE — 1B-1

▼

THE WIRELESS TERMINAL CHOOSING A PREFERRED PARAMETER CONFIGURATION FROM AMONG THE SET OF PARAMETER CONFIGURATIONS OFFERED BY THE RADIO ACCESS NETWORK NODE — 1B-2

(56) References Cited

OTHER PUBLICATIONS

3GPP TS 36.331 V10.1.0; $3^{rd}$ Generation Partnership Project; Technical Specification Group Radio Access Network; Evolved Universal Terrestrial Radio Access (E-UTRA); Radio Resource Control (RRC); Protocol Specification (Release 10).

International Search Report and Written Opinion mailed May 2, 2012 in PCT Application No. PCT/SE2012/050113.

* cited by examiner

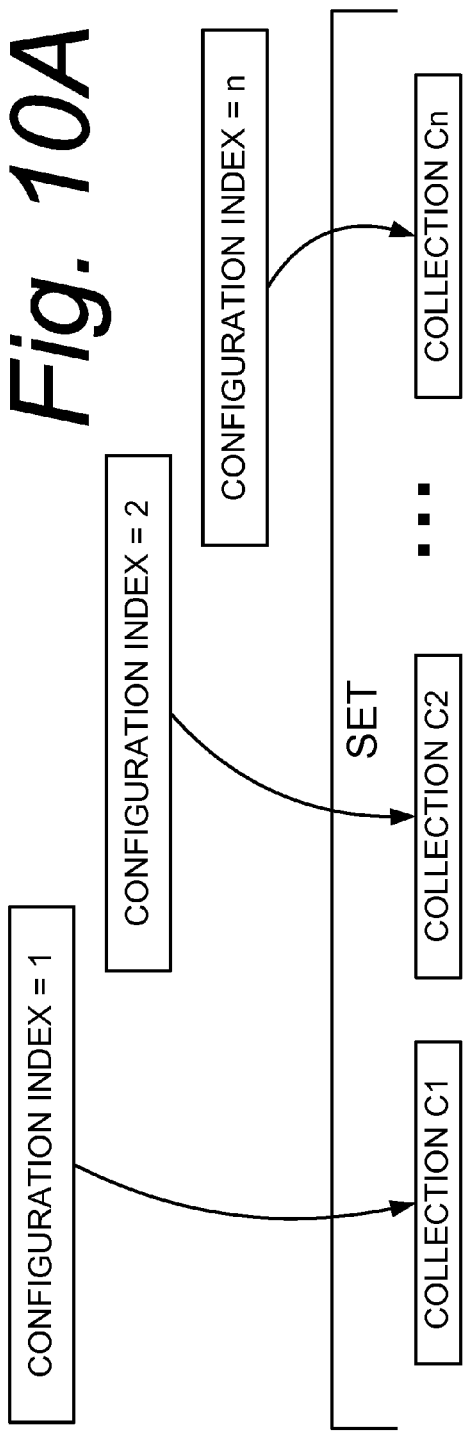
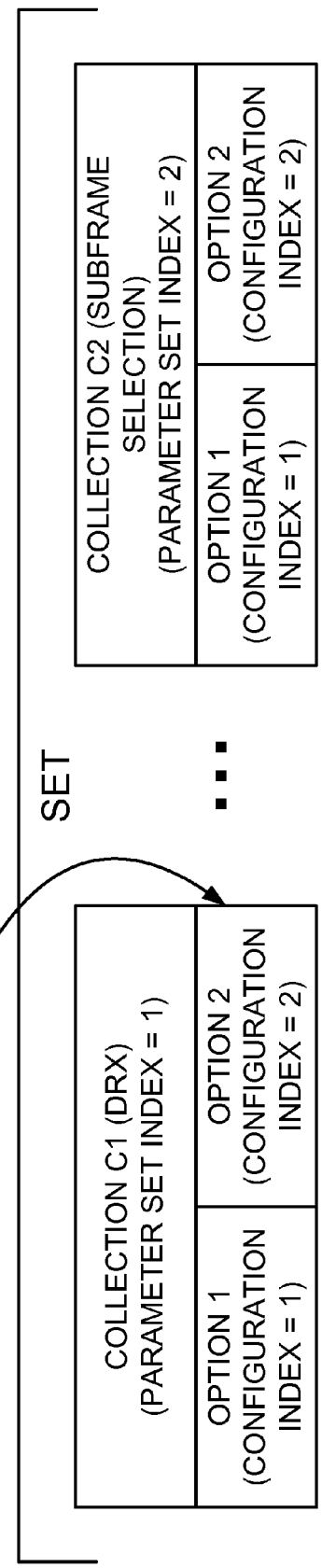
Fig. 10A
Fig. 10B

CONFIGURATION INDEX

| PARAMETER SET INDEX | CONFIGURATION INDEX |

R/R/E/LCID sub-header

TERMINAL-BASED SELECTION OF RADIO PARAMETERS AMONG A PARAMETER SUBSET OFFERED BY THE NETWORK

This application claims the priority and benefit of U.S. provisional patent application 61/475,077, filed Apr. 13, 2011, which is incorporated herein by reference in its entirety.

TECHNICAL FIELD

This invention pertains to telecommunications, and particularly to structure and method for selecting radio parameters for use, e.g., by a wireless terminal.

BACKGROUND

In a typical cellular radio system, wireless terminals (also known as mobile stations and/or user equipments (UEs)) communicate via a radio access network (RAN) to one or more core networks. The wireless terminals can be mobile stations or user equipments (UE) such as mobile telephones ("cellular" telephones) and laptops with wireless capability (e.g., mobile termination), and thus can be, for example, portable, pocket, hand-held, computer-included, or car-mounted mobile devices which communicate voice and/or data via radio access network.

The radio access network (RAN) covers a geographical area which is divided into cell areas, with each cell area being served by a base station, e.g., a radio base station (RBS), which in some networks is also called "NodeB" or "eNodeB". A cell is a geographical area where radio coverage is provided by the radio base station equipment at a base station site. Each cell is identified by an identity within the local radio area, which is broadcast in the cell. The base stations communicate over the air interface operating on radio frequencies with the user equipments (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipments (UEs). The Third Generation Partnership Project (3GPP) has undertaken to evolve further the UTRAN and GSM based radio access network technologies.

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base station nodes. As such, the radio access network (RAN) of an LTE system has an essentially "flat" architecture comprising radio base station nodes without reporting to radio network controller (RNC) nodes.

In LTE the radio network configures the wireless terminal, e.g., the UE, according to the RRC protocol specification (3GPP TS 36.331), incorporated herein by reference. It is up to the network to choose suitable parameter values in order to reach the desired performance, network capacity or coverage. For many of those parameters the network is able to choose a reasonable value without additional information from the UE. For other parameters or decision the UE provides the network with explicit information such as radio measurements which allows the network to decide, e.g., on whether to perform a handover, to configure another transmission mode, or to add a secondary serving cell.

Recently it has been discussed whether the UE shall be allowed/enabled not only to provide measurements, but also to suggest explicit parameter values. UE-provisioned/suggested parameter configurations were supported in earlier versions of the UMTS standard, e.g., for requesting certain QoS handling. But the existing RRC protocol defined in 3GPP TS 36.331 does not allow the UE to suggest or recommend radio parameters to the network. In certain cases (e.g. for the discontinuous reception (DRX) configuration) this may result in inferior performance or too high battery consumption.

Protocols by which the UE could request certain parameter configurations did exist for earlier protocol versions, e.g., in UMTS. However, the drawback of those solutions was that a large number of parameter combinations could be requested, of which most were not supported or at least not properly tested. Even if they were tested, the network had no means to verify that they were allowed/appropriate for this particular UE. Therefore, the concept of a UE requesting parameters to be configured did not work properly and network implementations previously ignored any such requests.

SUMMARY

As one of the example aspects of the technology disclosed herein, a wireless terminal (e.g., user equipment (UE)) is allowed to choose a preferred parameter configuration from among a set of parameter configurations, e.g., from among plural parameter configurations, offered by a network. In other words, the network may provide the UE with multiple collections of parameter values among which the UE can choose the configuration considered most suitable for its needs. In an example embodiment and mode, the wireless terminal makes a selection or choice of a preferred parameter configuration in the area of DRX (discontinuous reception).

In one of its aspects the technology disclosed herein concerns a method of operating a telecommunications system. In its basic mode, the method comprises a radio access network node offering plural parameter configurations to a wireless terminal over a radio interface and the wireless terminal choosing a preferred parameter configuration from among the plural parameter configurations offered by the radio access network node.

In an example embodiment and mode, each of said parameter configurations comprises a collection of parameter values.

In an example embodiment and mode, each of said parameter configurations is associated with an index.

In an example embodiment and mode, the method further comprises the radio access network node offering the plural parameter configurations in a radio resource control (RRC) Connection Reconfiguration message.

In an example embodiment and mode, the method further comprises the radio access network node offering the plural parameter configurations as a list of discontinuous reception (DRX) configuration information elements, each discontinuous reception (DRX) configuration information element comprising one parameter value for each of the one or more corresponding discontinuous reception parameters defined for the configuration information element. Thus, the "plural parameter configurations" comprise a collection of DRX-Config elements, each DRX-Config element comprising one or more of parameters with one value for each parameter. Not all parameters need to be present in each DRX-Config.

In an example embodiment and mode, the method further comprises the wireless terminal signaling the preferred parameter configuration to the radio access network node.

In an example embodiment and mode, the method further comprises the wireless terminal signaling the preferred parameter configuration to the radio access network node in the form of a collection of parameter values.

In an example embodiment and mode, the method further comprises the wireless terminal signaling the preferred parameter configuration to the radio access network node in the form of an index identifying the preferred parameter configuration among the plural parameter configurations offered by the radio access network node.

In an example embodiment and mode, the method further comprises the wireless terminal providing the preferred parameter configuration in a radio resource control (RRC) Connection Reconfiguration Complete message.

In an example embodiment and mode, the method further comprises the wireless terminal providing the preferred parameter configuration in a medium access control (MAC) control element.

In an example embodiment and mode, the method further comprises limiting repeated transmission of said control element by means of a timer.

In an example embodiment and mode, the method further comprises the radio access network node evaluating the preferred parameter configuration chosen by the wireless terminal.

In an example embodiment and mode, the method further comprises the radio access network node evaluating the preferred parameter configuration chosen by the wireless terminal in accordance with at least one of the following: (1) whether the radio access network node is able to configure the wireless terminal with the preferred parameter configuration; and, (2) whether the preferred parameter configuration is suitable for an observed traffic pattern.

In an example embodiment and mode, the method further comprises: the wireless terminal providing a notification to the radio access network node of the preferred parameter configuration; and the radio access network node updating configuration parameters for the wireless terminal in accordance with the notification.

In another of its aspects the technology disclosed herein concerns a method of operating a radio access network node of a telecommunications system. In a basic mode the method comprises the radio access network node offering plural parameter configurations to a wireless terminal over a radio interface; and, the radio access network node thereafter communicating with the wireless terminal based on a preferred parameter configuration chosen by the wireless terminal from among the plural parameter configurations offered by the radio access network node.

In an example embodiment and mode each of said parameter configurations comprises a collection of parameter values.

In an example embodiment and mode the each of said parameter configurations is associated with an index.

In an example embodiment and mode the method further comprises the radio access network node offering the plural parameter configurations in a radio resource control (RRC) Connection Reconfiguration message.

In an example embodiment and mode the method further comprises the radio access network node offering the plural parameter configurations as a list of discontinuous reception (DRX) configuration information elements, each discontinuous reception (DRX) configuration information element comprising one parameter value for each of the one or more corresponding discontinuous reception parameters defined for the configuration information element.

In an example embodiment and mode the method further comprises the radio access network receiving signaling of the preferred parameter configuration from the wireless terminal.

In an example embodiment and mode the method further comprises the radio access network receiving signaling of the preferred parameter configuration from the wireless terminal in the form of a collection of parameter values.

In an example embodiment and mode the method further comprises the radio access network receiving signaling of the preferred parameter configuration to the radio access network node in the form of an index identifying the preferred parameter configuration among the plural parameter configurations offered by the radio access network node.

In an example embodiment and mode the method further comprises the radio access network node evaluating the preferred parameter configuration chosen by the wireless terminal.

In an example embodiment and mode, the method further comprises the wireless terminal providing the preferred parameter configuration in a radio resource control (RRC) Connection Reconfiguration Complete message.

In an example embodiment and mode, the method further comprises the wireless terminal providing the preferred parameter configuration in a medium access control (MAC) control element.

In an example embodiment and mode, the method further comprises limiting repeated transmission of said control element by means of a timer.

In an example embodiment and mode the method further comprises the radio access network node evaluating the preferred parameter configuration chosen by the wireless terminal in accordance with at least one of the following: (1) whether the radio access network node is able to configure the wireless terminal with the preferred parameter configuration; and, (2) whether the preferred parameter configuration is suitable for an observed traffic pattern.

In an example embodiment and mode the method further comprises the radio access network node updating configuration parameters for the wireless terminal in accordance a notification of the preferred parameter configuration received from the wireless terminal.

In an example embodiment and mode, the method further comprises the radio access network updating the configuration parameters by means of a radio resource control (RRC) Connection Reconfiguration message.

In another of its aspects the technology disclosed herein concerns a radio access network node of a telecommunications system which communicates over a radio interface with a wireless terminal. In a basic embodiment the node comprises an entity configured to generate plural parameter configurations to offer to a wireless terminal over the radio interface and a communications interface through which the plural parameter configurations are offered to the wireless terminal.

In an example embodiment each set of parameter configurations comprises a collection of parameter values.

In an example embodiment each of said parameter configurations is associated with an index.

In an example embodiment the entity is configured to offer the plural parameter configurations in a radio resource control (RRC) Connection Reconfiguration message.

In an example embodiment the entity is configured to offer the plural parameter configurations as a list of discontinuous reception (DRX) configuration information elements, each discontinuous reception (DRX) configuration information element comprising one parameter value for each of the one or more corresponding discontinuous reception parameters defined for the configuration information element In an example embodiment the entity is further configured to receive signaling of the preferred parameter configuration from the wireless terminal.

In an example embodiment the entity is further configured to receive signaling of the preferred parameter configuration from the wireless terminal in the form of a collection of parameter values.

In an example embodiment the entity is further configured to receive signaling of the preferred parameter configuration in the form of an index identifying the preferred parameter configuration among the plural parameter configurations offered by the radio access network node.

In an example embodiment the entity is further configured to evaluate the preferred parameter configuration chosen by the wireless terminal.

In an example embodiment the entity is further configured to evaluate the preferred parameter configuration chosen by the wireless terminal in accordance with at least one of the following: (1) whether the radio access network node is able to configure the wireless terminal with the preferred parameter configuration; and, (2) whether the preferred parameter configuration is suitable for an observed traffic pattern.

In an example embodiment the entity is further configured to update configuration parameters for the wireless terminal in accordance with a notification of the preferred parameter configuration received from the wireless terminal.

In another of its aspects the technology disclosed herein concerns a method of operating a wireless terminal which communications with a radio access node over a radio interface. In a basic mode the method comprises the wireless terminal receiving plural parameter configurations offered to a wireless terminal over the radio interface; and, the wireless terminal choosing a preferred parameter configuration from among the plural parameter configurations offered by the radio access network node.

In an example embodiment and mode each set of parameter configurations comprises a collection of one or more parameters, each parameter having one value.

In an example embodiment and mode each of said parameter configurations is associated with an index.

In an example embodiment and mode the method further comprises the wireless terminal receiving the plural parameter configurations offered by the radio access network node in a radio resource control (RRC) Connection Reconfiguration message.

In an example embodiment and mode the method further comprises the wireless terminal receiving the plural parameter configurations as a list of discontinuous reception (DRX) configuration information elements, each discontinuous reception (DRX) configuration information element comprising one parameter value for each of the one or more corresponding discontinuous reception parameters defined for the configuration information element. In an example embodiment and mode the method further comprises the wireless terminal signaling the preferred parameter configuration to the radio access network node.

In an example embodiment and mode the method further comprises the wireless terminal signaling the preferred parameter configuration to the radio access network node in the form of a collection of parameter values.

In an example embodiment and mode the method further comprises the wireless terminal signaling the preferred parameter configuration to the radio access network node in the form of an index identifying the preferred parameter configuration among the plural parameter configurations offered by the radio access network node.

In an example embodiment and mode the method further comprises the wireless terminal providing the preferred parameter configuration in a radio resource control (RRC) Connection Reconfiguration Complete message.

In an example embodiment and mode the method further comprises the wireless terminal providing the preferred parameter configuration in a control element.

In an example embodiment and mode the method further comprises limiting repeated transmission of said control element by means of a timer.

In another of its aspects the technology disclosed herein concerns a wireless terminal. In a basic embodiment the wireless terminal comprises a communication interface through which the wireless terminal receives over a radio interface plural parameter configurations offered by a radio access network node; and, an entity configured to choose a preferred parameter configuration from among the plural parameter configurations offered by the radio access network node.

In an example embodiment each set of parameter configurations comprises a collection, each collection comprising one value for each of the one or more parameters defined for the collection (or information element representing the collection).

In an example embodiment the plural parameter configurations comprises a list of discontinuous reception (DRX) configuration information elements, each discontinuous reception (DRX) configuration information element comprising one parameter value for each of the one or more corresponding discontinuous reception parameters defined for the configuration information element.

In an example embodiment the entity is configured to signal the preferred parameter configuration to the radio access network node.

In an example embodiment the entity is configured to signal the preferred parameter configuration to the radio access network node in the form of a collection of parameter values.

In an example embodiment the entity is configured to signal the preferred parameter configuration to the radio access network node in the form of an index identifying the preferred parameter configuration among the plural parameter configurations offered by the radio access network node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 10A and FIG. 10B are diagrammatic views, each depicting an example scenario of a set of plural collections of parameter values, with each collection of FIG. 10A being associated with one option and with at least some of the collections of FIG. 10B being associated with plural options.

DETAILED DESCRIPTION

Figure 1A:
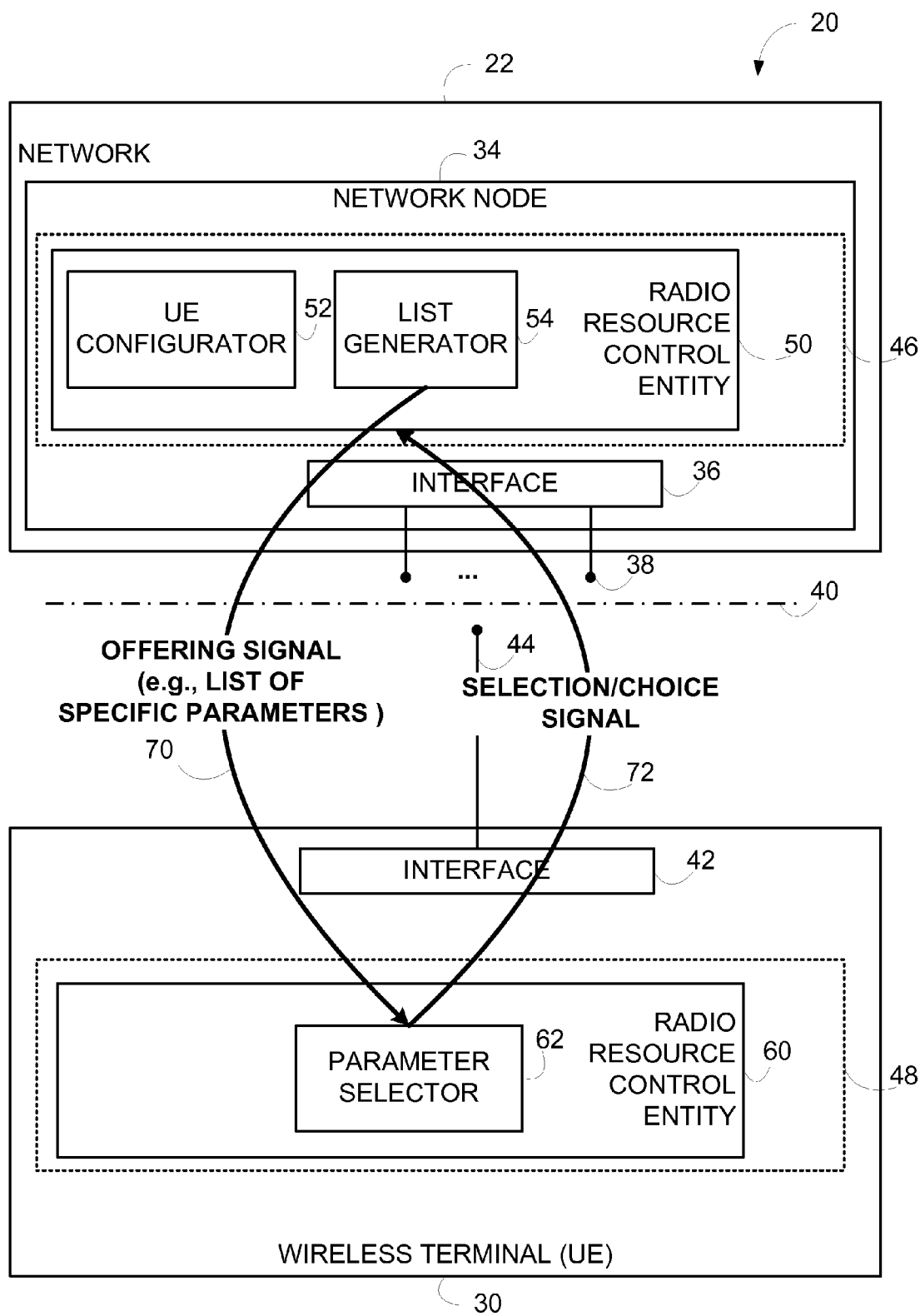
FIG. 1A is a diagrammatic view of portions of a telecommunications system including a wireless terminal (UE) which is allowed to choose a parameter configuration according to an example embodiment.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1A shows portions of a first example embodiment and mode of a telecommunications system 20. The system of FIG. 1A includes a network 22 which communicates with or serves a wireless terminal 30, also known as a "UE". The network 22 may comprise plural nodes or entities, only an example or representative node being shown as node 34 in FIG. 1A. At least some nodes of the network 22 typically comprise communication interface 36 which is connected to or comprises one or more antennas 38 configured for radio frequency communication across a radio or air interface 40 (represented by the dash-dotted line of FIG. 1A) with the wireless terminal (UE) 30. Similarly the wireless terminal 30 comprises a communication interface 42 which also may comprise or be connected to one or more antenna 44 for facilitating radio frequency communication across the air or radio interface 40.

The network node 34 may be any appropriate node, such as (for example) a base station (BS) node (in LTE parlance also known as an eNodeB or eNB) or any other node or entity suitable for performing the functionalities (e.g., UE configuration functionalities) described herein. The person skilled in the art appreciates that such network node(s) or entity(ies) include many other functionalities and units not specifically described herein and which generally characterize operation of such nodes or entities. In some embodiments, functionalities of the network node including those described herein may be performed by a machine such as an electronic circuit which can take the form of a computer or processor implementation or a hardwired circuit (e.g., ASIC) implementation. In FIG. 1A and other illustrations herein such machine or electronic circuit is depicted by a broken line 46 which frames various functionalities of the network node which may be included on a machine platform. In similar manner, the person skilled in the art realizes that the wireless terminal (UE) 30 also comprises other functionalities and units not specifically described herein. In some embodiments functionalities of the wireless terminal (UE) including those described herein may also be performed by a machine such as an electronic circuit which can take the form of a computer or processor implementation or a hardwired circuit (e.g., ASIC) implementation. So also in FIG. 1A and other illustrations herein such machine or electronic circuit is depicted by a broken line 48 which frames various functionalities of the wireless terminal (UE) 30 which may be included on a machine platform.

As one of the example aspects of the technology disclosed herein, a wireless terminal (e.g., user equipment (UE) 30) is allowed to choose a preferred parameter configuration from among a set of parameter configurations, e.g., from among plural parameter configurations, offered by a network. In other words, the network may provide the UE with multiple collections of parameter values among which the UE can choose the configuration considered most suitable for its needs. As used herein, "set" and "list" are used interchangeably and refer to plural collections of parameter value(s), and it should be understood that each collection may comprise one value for each of the one or more parameters defined, e.g., for an information element.

As shown in FIG. 1A and other figures, in example embodiments network node 34 comprises an entity 50 which prepares and/or offers parameter configurations for/to the wireless terminal 30. In an example implementation, the entity 50 is a radio resource control entity, e.g., a RRC entity. In example embodiments radio resource control entity 50 in turn comprises UE configurator 52 and list or set generator 54. The terms "UE configurator 52" and "list generator 54" are employed for convenience in describing the functionalities or sub-entities which perform the functions herein prescribed for each, it being understood that other appellations could alternatively be used.

FIG. 1A and other figures, example embodiments the wireless terminal 30 comprises an entity 60 which selects or chooses a preferred parameter configuration from among the set or list of parameter configurations offered by the radio access network node. In example implementations, the entity 60 is a radio resource control entity, e.g., a RRC entity. In example embodiments radio resource control entity 60 in turn comprises parameter selector 62. The terminology "parameter selector" is employed for convenience in describing the functionalities or sub-entities which perform the functions herein attributed thereto, it again being understood that other appellations could alternatively be used to describe the functionalities or sub-entities which implement the protocols and/or procedures herein described.

The entity 50 of the network node 34 and entity 60 of the wireless terminal 30 need not necessarily be radio resource control (RRC) entities, but in other embodiments can be medium access control (MAC) entities or other entities such as those understood to operate in the manner of or similar to those described in 3GPP TS 36.331, section 5.6, which is incorporated herein by reference.

In a preferred example embodiment, the network 22 chooses an initial or default configuration and applies the initial configuration to the wireless terminal (UE) 30, e.g., during RRC Connection Reconfiguration. For example, the network 22 chooses a set of initial configuration parameters which it considers at least initially suitable for this particular wireless terminal 30. The initial configuration parameters may be used for communication by the wireless terminal 30 until the wireless terminal 30 has made its choice among the configuration options offered by the network 22.

Figure 1B:
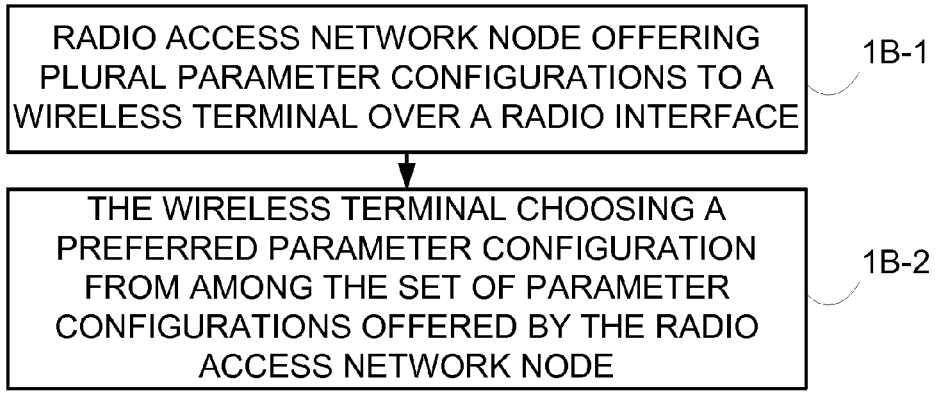
FIG. 1B, FIG. 1C, and FIG. 1D are flowcharts illustrating example acts or steps comprising methods of respectively operating a communication system, a network node, and a wireless terminal according to the example embodiment of FIG. 1A.

In addition to the initial configuration, at some point in time the network 22 provides the wireless terminal (UE) 30 with a list of options as generally depicted in FIG. 1A. In an example, non-limiting implementation such list of options may be provided contemporaneously with or near contemporaneously with the provision of the initial configuration, or at any later point in time That is, the list generator 54 of network 22 prepares and offers to wireless terminal 30 (over radio interface 40) plural parameter configurations for configuring the wireless terminal 30. Such offering of plural parameter configurations is depicted as act 1B-1 in a method of operating a communications system according to an example embodiment and mode as shown in FIG. 1B. In particular, act 1B-1 comprises the radio access network node offering plural parameter configurations to a wireless terminal over a radio interface. Act 1B-2 comprises the wireless terminal 30 choosing a preferred parameter configuration from among the set of parameter configurations offered by the radio access network node. Thus, the wireless terminal 30 is allowed to choose a preferred parameter configuration among plural parameter configurations offered by a network. In other words, the network may provide the UE with multiple collections of parameter values among which the UE can choose the configuration considered most suitable for its needs.

The radio access network node may offer the plural parameter configurations as act 1B-1 in an "offering" message or signal (depicted as message 70 in FIG. 1A and other figures). In an example embodiment and mode, the radio access network node may offer the plural parameter configurations as act 1B-1 in a message or signal of a type known as a radio resource control (RRC) Connection Reconfiguration message. Then, in response, the wireless terminal 30 may provide its preferred parameter configuration as act 1B-2 in a "selection/choice" message or signal (depicted as message 72 in FIG. 1A and other figures). In an example embodiment and mode, the selection/choice message or signal 72 of act 1B-2 may be of a type known as a radio resource control (RRC) Connection Reconfiguration Complete message.

Figure 1C:
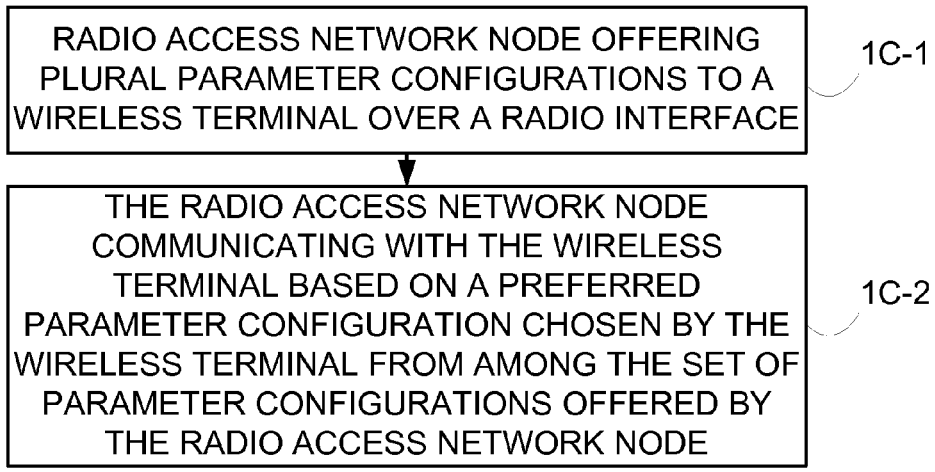

FIG. 1C illustrates example, representative acts or steps included in an example embodiment and mode of operating a radio access network node (such as node 34) of a telecommunications system. Act 1C-1 comprises the radio access network node offering the plural parameter configurations to a wireless terminal over the radio interface, as above described with reference to act 1B-1. Act 1C-2 comprises the radio access network node thereafter communicating with the wireless terminal based on a preferred parameter configuration chosen by the wireless terminal from among the plural parameter configurations offered by the radio access network node. Intermediate act 1C-1 and act 1C-2 the radio access network node receives the preferred parameter configuration from the wireless terminal; performs reconfiguration so that the radio access network node and the wireless terminal can communicate according to the preferred parameter configuration; and, receives confirmation from the wireless terminal that the reconfiguration according to the preferred parameter configuration is acceptable.

Figure 1D:
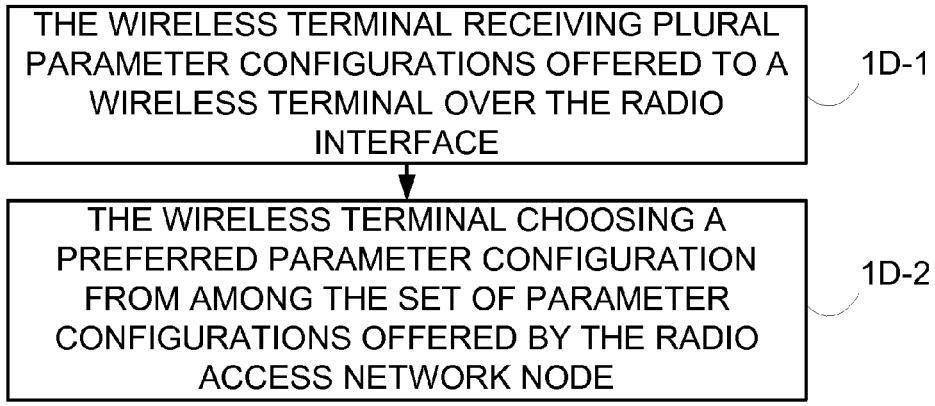

FIG. 1D illustrates example, representative acts of steps included in an example embodiment and mode of operating a wireless terminal (such as UE 30) of a telecommunications system. Act 1D-1 comprises the wireless terminal receiving plural parameter configurations offered to a wireless terminal over the radio interface. Act 1D-2 comprises the wireless terminal choosing a preferred parameter configuration from among the plural parameter configurations offered by the radio access network node, much in the manner of act 1B-1 described above. After the reconfiguration (e.g., according to the preferred parameter configuration) has occurred, the wireless terminal confirms that the reconfiguration implemented by the network (e.g., according to the preferred parameter configuration) is acceptable In an example embodiment and mode, the network node 34 offers a choice, and the wireless terminal 30 makes a selection or choice of a preferred parameter configuration (e.g., performs acts 1B-2 and 1D-2) in the area or context of DRX (discontinuous reception). Regarding discontinuous reception (DRX) in general, see, e.g., 3GPP TS 36.321, incorporated herein by reference). Long Term Evolution (LTE) supports Discontinuous Reception (DRX) to enable UE power savings by turning off some or all of the radio circuitry of the UE, thereby increasing the battery life time of the UE. The DRX function is configured and controlled by the network. The UE behavior is based on a set of rules that define when the UE shall monitor the PDCCH for scheduling assignments. The DRX function is characterized by a DRX cycle, an on-duration period, and an inactivity timer. The UE wakes up and monitors the PDCCH at the beginning of every DRX cycle for the entire on-duration period. If no scheduling assignment has been received, the UE falls back asleep again. Whenever the UE receives an assignment from the network, it starts (or restarts) the inactivity timer and continues to monitor the PDCCH until the timer expires. The HARQ operation overrides the DRX function. Thus, the UE wakes up for possible HARQ feedback as well as for possible retransmissions during a configurable amount of time as soon as a retransmission can be expected.

As an example of suggesting parameter values for discontinuous transmission (DTX), for example, a UE aiming to improve battery life-time could request the network to configure long sleep-intervals interrupted by only short OnDurations. In addition, some UEs may want to have a long continuous active time by having a long drx-InactivityTimer. Another UE may put focus on low latency and therefore appreciate a configuration with shorter sleep intervals.

Thus, in an example embodiment and mode, the method comprises the radio access network node offering the plural parameter configurations as a list of discontinuous reception (DRX) configuration information elements, each discontinuous reception (DRX) configuration information element comprising one parameter value for each of the one or more corresponding discontinuous reception parameters defined for the configuration information element For example, in the DRX context the configuration options presented by the network node 34 may be a list of "DRX-Config" information elements (IEs), each information element containing a value for one or more corresponding DRX parameters included in the IE (see 3GPP TS 36.331, section 6.3.2, MAC-MainConfig).

The Discontinuous Reception (DRX) context is just one example context in which the technology disclosed herein may be employed. As another example context the wireless terminal 30 may wish to limit or influence which subframes (also known as transmission time intervals (TTIs)) in which the network will instruct or expect the wireless terminal 30 to transmit or receive data. This subframe selection/control may be useful for but is not limited to coexistence problems with other radio access technologies hosted in the same wireless terminal. In an example implementation of the subframe selection context, the network may provide the wireless terminal with a list of subframe patterns (e.g. a bitmap where each bit refers to a particular subframe). The subframe patterns may differ in the number and/or distribution of restricted subframes. The wireless terminal, if facing coexistence problems, could choose a subframe pattern that is most appropriate to solve (for example) the above-mentioned coexistence problems and provide the wireless terminal's choice to the network, in similar manner as discussed above with reference to FIG. 1A and FIG. 1B.

Yet another example context of operation for the technology disclosed herein the list of configuration options could also comprise parameters or characteristics that determine the network behavior such as state transitions from a high performance state (e.g. RRC CONNECTED) to a power saving state (e.g. IDLE).

Figure 2:
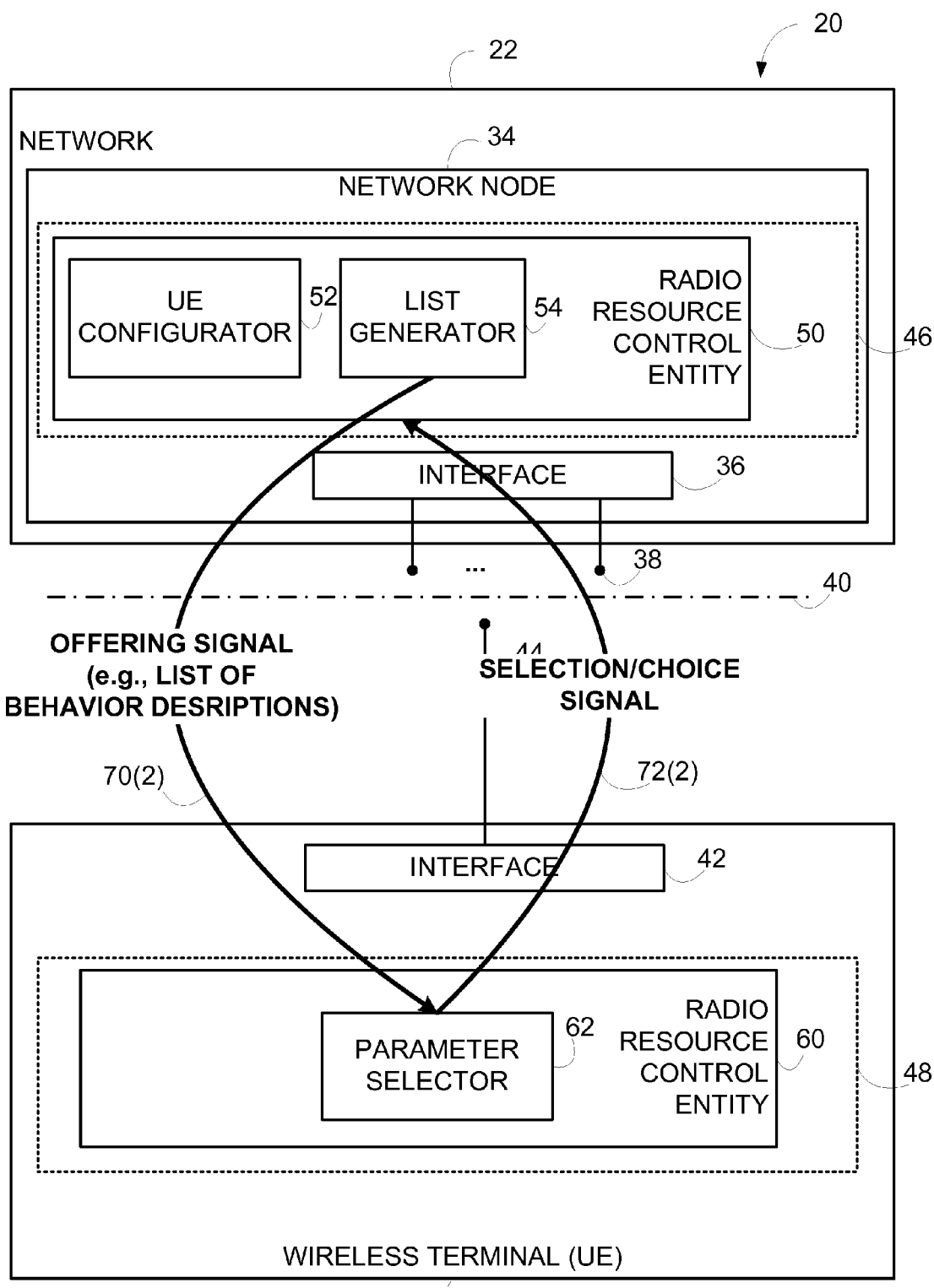
FIG. 2-FIG. 3, FIG. 4A, FIG. 4B, FIG. 5-FIG. 8 are diagrammatic views of portions of a telecommunications system including a wireless terminal (UE) which is allowed to choose a parameter configuration according to respective differing other example embodiments.
Figure 3:
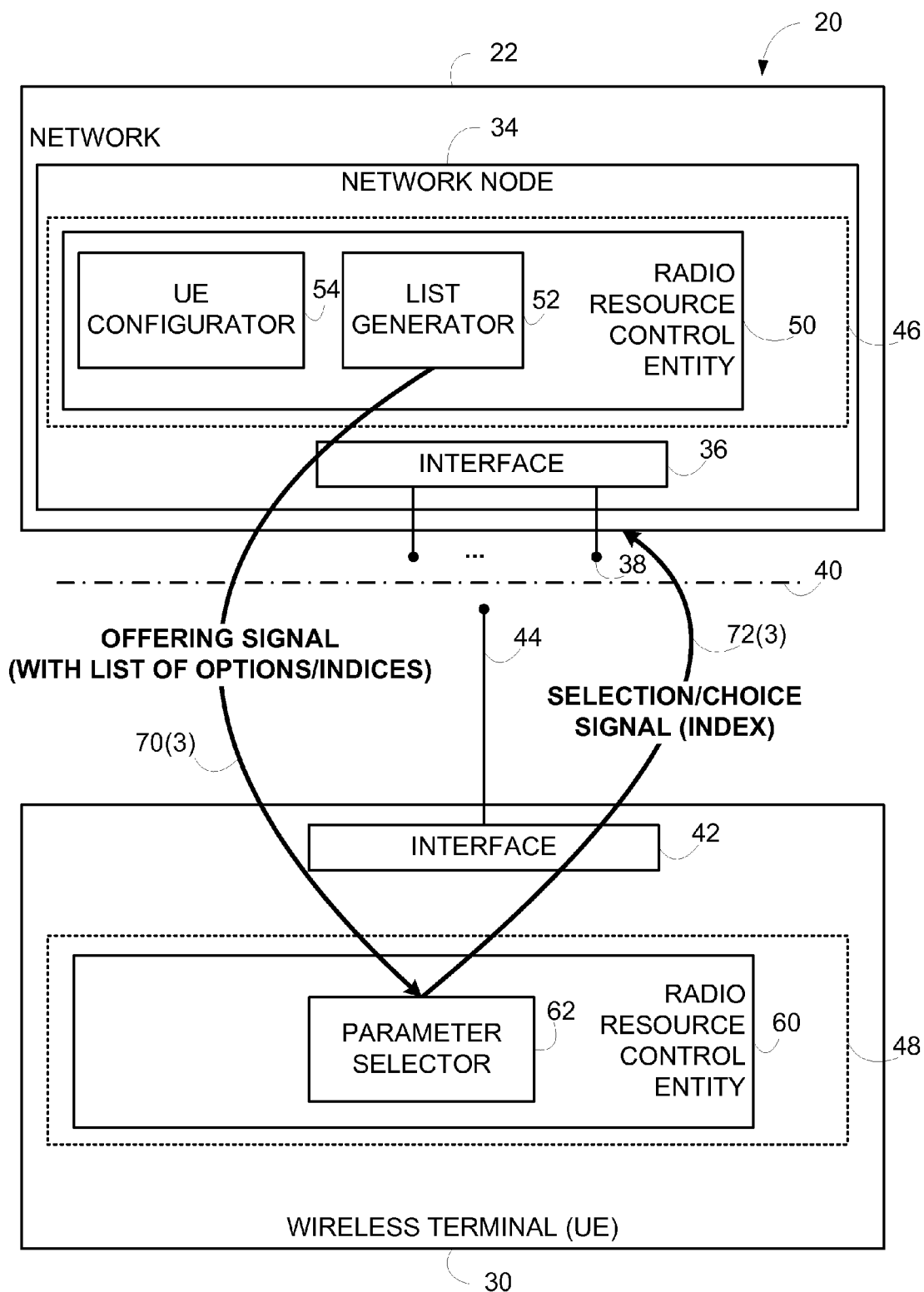

In the particular example embodiment and mode illustrated in FIG. 1A the signaling or messaging between the network node 34 and the wireless terminal 30 may be in the form of or comprise a parameter list. But the technology disclosed herein is not limited to signaling of one or more parameter(s) or parameter list per se, either on the downlink from the network node 34 to the wireless terminal 30 or on the uplink from the wireless terminal 30 to the network node 34. For example, in another embodiment illustrated by FIG. 2, instead of providing specific parameters as defined in the specification and applied by the wireless terminal 30 (UE), the configuration options may be a list of descriptors for the behavior resulting from the parameter combination the network will apply if the UE chooses that option. FIG. 2 thus shows the offering message 70(2) as comprising a list of behavior descriptions. For example, the network could provide a descriptor such as "battery-optimized" or, more simply, "battery" to reflect a desired battery saving behavior. On the other hand, the network may provide a descriptor such as and "latency-optimized" or, more simply, "performance" descriptor if the concern for performance predominates over battery saving. In the FIG. 2 embodiment the wireless terminal 30 chooses one of the descriptors and reports the chosen descriptor to the network in descriptor selection/choice message 72(2). Upon receiving such descriptor the network determines (e.g., by a table lookup) a suitable parameter configuration resulting in a behavior corresponding to the chosen descriptor. For example, the network could decide to provide a new DRX configuration (see "DRX-Config" in 3GPP TS 36.331, section 6.3.2) to the wireless terminal 30.

As shown by the preceding example embodiments and modes, the wireless terminal may, after applying the initial configuration, choose one of the offered configuration options and signal it to the network in a selection/choice message such as message 72. As mentioned above, the wireless terminal (UE) 30 may comprise a parameter selector 62 configured to select or chose the preferred parameter configuration. The signaling (represented by the "selection/choice signal 72) of the preferred parameter configuration may comprise the entire parameter list (e.g., as encompassed by the embodiment of FIG. 1A) or a descriptor of the preferred parameter configuration (as encompassed by the embodiment of FIG. 2).

FIG. 10A illustrates an example scenario in which list generator 54 of the network may generate a set comprising plural collections of parameter values, e.g., collections C1 through Cn. Each collection of FIG. 10A may be associated with or identified by a configuration index. Differing collections of a set may be pointed to by a differing respective configuration index. For example, in a situation such as FIG. 10A in which all collections refer to a same area or context of technology application (such as discontinuous reception (DRX) operation, for example), a configuration index=1 may point to a first collection C1, a configuration index=2 may point to a second collection C2, and so forth up to a configuration index=n pointing to a second collection Cn. In an example embodiment the network may provide the "index" value together with the set of Collections, and in its response the wireless terminal refers to one collection by means of the associated index The network node 22 and wireless terminal 30 may have stored therein tables of data for associating each index value with its respective collection, and the index value or the collection with the values of the parameters of the collection.

In another example embodiment and mode, differing collections of the set offered by the network may pertain to differing areas or contexts of technology application. For example, collection C1 of the set may be offered as one of one or more collections that affect the discontinuous reception (DRX) operation of wireless terminal 30, collection C2 of the set may be offered as one of one or more collections of the set that affect the subframe selection operation of wireless terminal 30, or the like.

Thus, differing collections of the set may pertain to differing types of areas of contexts of operation of the wireless terminal 30. In one such example embodiment and mode, illustrated simply in FIG. 10B, a parameter set index having an index value of 1 may point to a collection which pertains to discontinuous reception (DRX) parameters, whereas a parameter set index having an index value of 2 may point to a collection C2 which pertains to subframe selection parameters. In the FIG. 10B example embodiment and mode, a collection may present or provide plural configuration options. To this end, another index, known herein as the configuration index, may be used to point to a particular option within a collection (the collection having been pointed to by the parameter set index). For example, FIG. 10B shows that a parameter set index value of 1 coupled with a configuration index value of 2 points to a second option of the configuration C1 (which, in the illustration of FIG. 10B, pertains to DRX). The network node 22 and wireless terminal 30 may have stored therein tables of data for determining, based on both the parameter set index and the configuration index, what collection is intended and the values of the parameters for the intended collection.

As understood from the foregoing, the list of options may be generated by list generator 52 of the network node 34. This list may be realized as an (indexed) list of information elements as they are used today for configuring parameters. In general, an ATN.1 representation of an information element (IE) is a collection of values that enables a receiver of the information element to associate each of the values with a corresponding parameter of the IE. In an example embodiment and mode the list of configuration options may be carried in the RRC Connection Configuration or in a separate message. Such separate message could be, e.g., be part of or comprise a new RRC procedure (see 36.331, section 5.6), and as such would be a network-initiated procedure. The response (which serves as the selection/choice signal 72(3)) could either be part of the same procedure or perhaps more preferably could be a separate procedure so that the wireless terminal 30 can update its choice at a later point in time even if the network does not send the offer again.

The signaling represented by the selection/choice signal 72 of the embodiments described herein may be/comprise or result from a separate procedure which the wireless terminal 30 may trigger at any point in time (e.g., when the traffic pattern changes). The message may be sent in the same protocol layer (e.g. RRC protocol layer) or in a separate protocol layer (e.g. MAC protocol layer). The latter could be useful if the preferred parameter configuration is expected or allowed to change frequently. In that case a MAC control element containing only the index of the currently preferred configuration option may reduce the signaling overhead significantly. In one embodiment, the maximum frequency at which the wireless terminal 30 may change its preferred configuration may be limited or updates may be allowed only under certain conditions (e.g. after adding or releasing a radio bearer).

It should be understood from the foregoing that the wireless terminal 30 can make its selection of the preferred parameter configuration when prompted to do so by the network, e.g., in response to offering signal 70. In some example embodiments, the wireless terminal 30 must continue or "live with" its selection until the network permits the wireless terminal 30 to make another selection, e.g., by the network providing the wireless terminal 30 with another offering signal 70. The advantage of such embodiments is that such operation causes essentially no signaling overhead. In these example embodiments only the existing messages grow perhaps slightly in size, but no additional messages can be initiated by the wireless terminal 30. But a drawback of such embodiments is that the wireless terminal 30 is not able to reverse or alter its choice of preferred parameter configuration. Imagine, for example, that the wireless terminal 30 has chosen a "battery efficient" configuration since there were maybe no active applications or since the display was turned off. Then, when some application starts or when the display is powered on or when an application indicates to the operating system that it requires optimal performance, the wireless terminal 30 would like to indicate such to the network.

In another example embodiment and mode the wireless terminal 30 may make another or further selection of the preferred parameter configuration at other times, e.g., at times other than when specifically requested to do so by the network (e.g., other than in response to an offering signal 70). At such other times the wireless terminal on its own initiative may seek to renew, re-select, or revise its preferred parameter configuration without being requested to do so by the network. For example, FIG. 4A illustrates an example embodiment and scenario in which the wireless terminal 30 not only generates a selection/choice signal 72(4) in response to the offering signal 70, but thereafter without intervention of another offering signal and essentially on initiative of wireless terminal 30 itself (although in perhaps to changed conditions such as traffic conditions) generates another selection/choice signal 73(4) which apprises the network of a renewed or revised preferred parameter configuration (e.g., renews or reasserts or revises the preferred parameter configuration option exercised or selected by the wireless terminal 30).

Figure 4A:
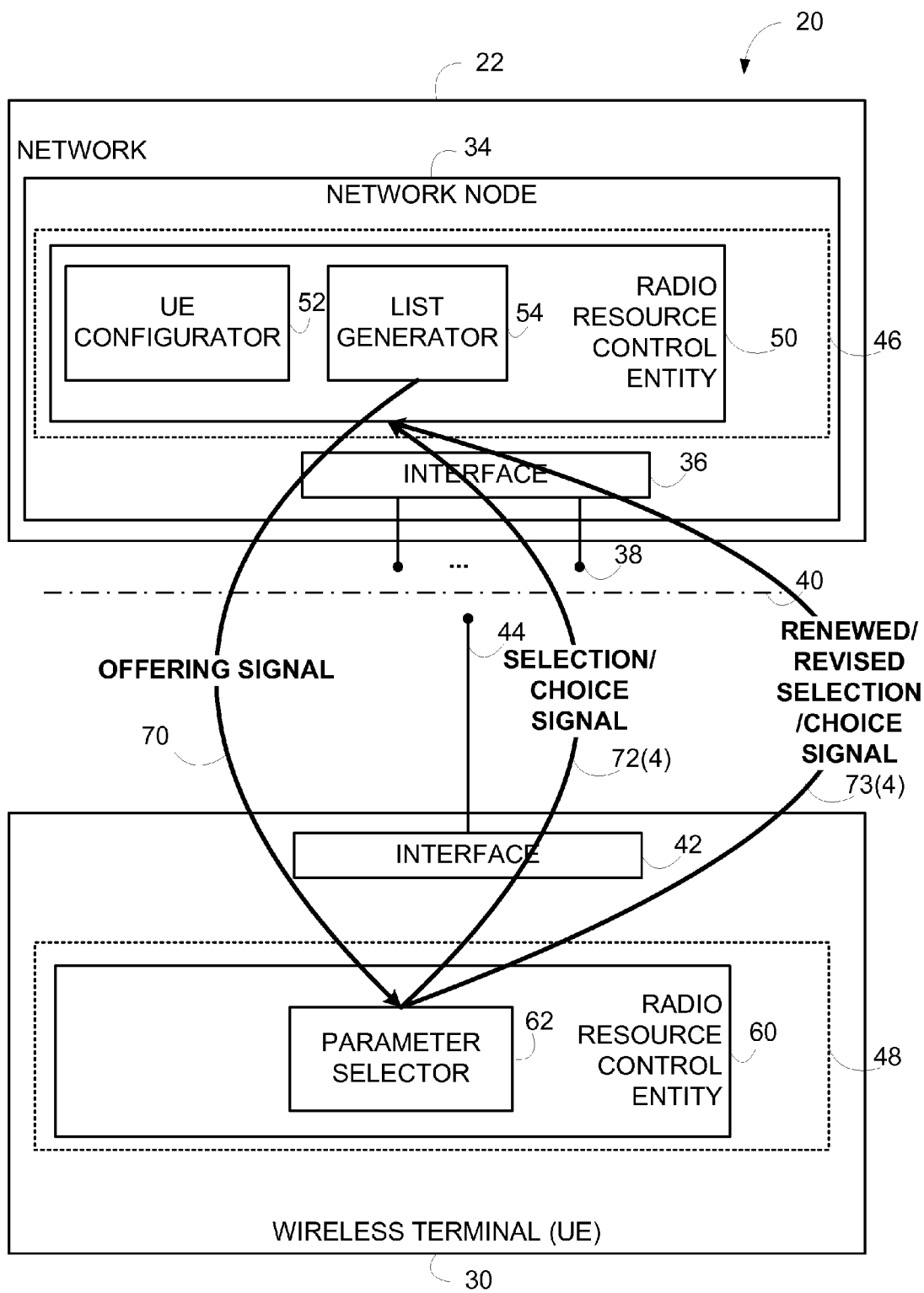
Figure 4B:
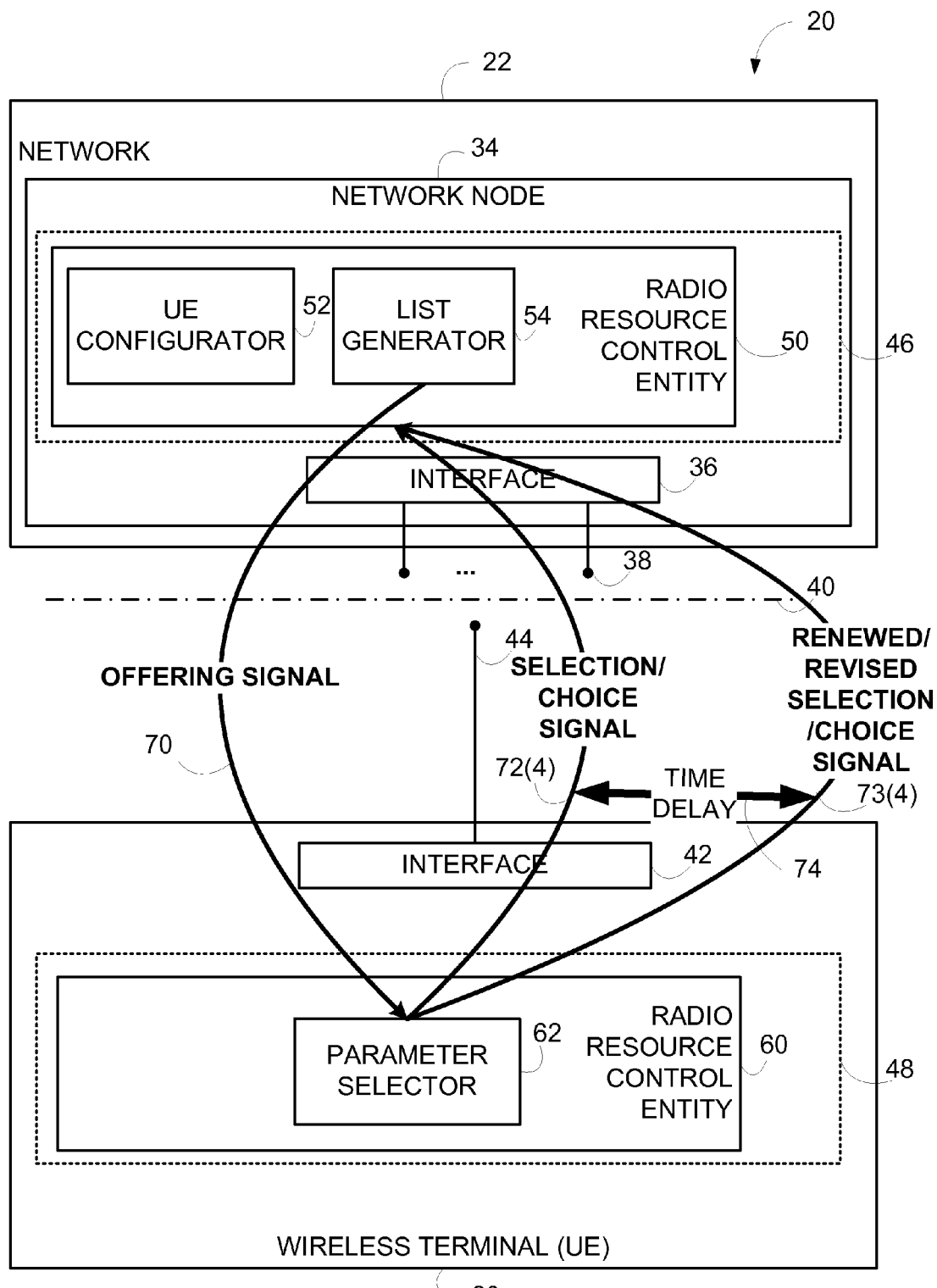

A potential drawback of the example embodiment and scenario of FIG. 4A is increased signaling. To prevent this, in an example embodiment such as that illustrated in FIG. 4B a feature or limitation such as a timer or other rule is included to require a time delay 74 between successive selection/choice messages 72(4) and 73(4). The time delay 74 may be imposed by a timer included in the entity 60, and particularly in parameter selector 62. For example, the wireless terminal 30 may not be permitted to provide the same choice in consecutive messages, i.e., it must not tell the network multiple consecutive times that it wants the battery efficient configuration. Either the network acts on the initial request or not, there being no need to repeat the request.

If the UE does not provide a preferred configuration option, in an example embodiment and mode the network may stick to or retain the current configuration or it may apply other means to optimize the configuration at a later point in time. The current configuration may be the initial or default configuration mentioned above.

In the above regard, the network may conclude that the wireless terminal has not provided a preferred configuration option. For example, the network may reach a conclusion of non-selection by the wireless terminal if the wireless terminal 30 has not include a preferred choice (if it has any) in a selection/choice signal 72 (e.g., RRC Connection Reconfiguration Complete message) which it must send immediately (<20 ms) after receiving the offering signal 70 (e.g., a RRC Connection Reconfiguration message from the network). In such case the network reaches its conclusion of non-selection after a timeout. If the UE does not make a choice, the network assumes that the UE is satisfied with the current configuration.

Figure 5:
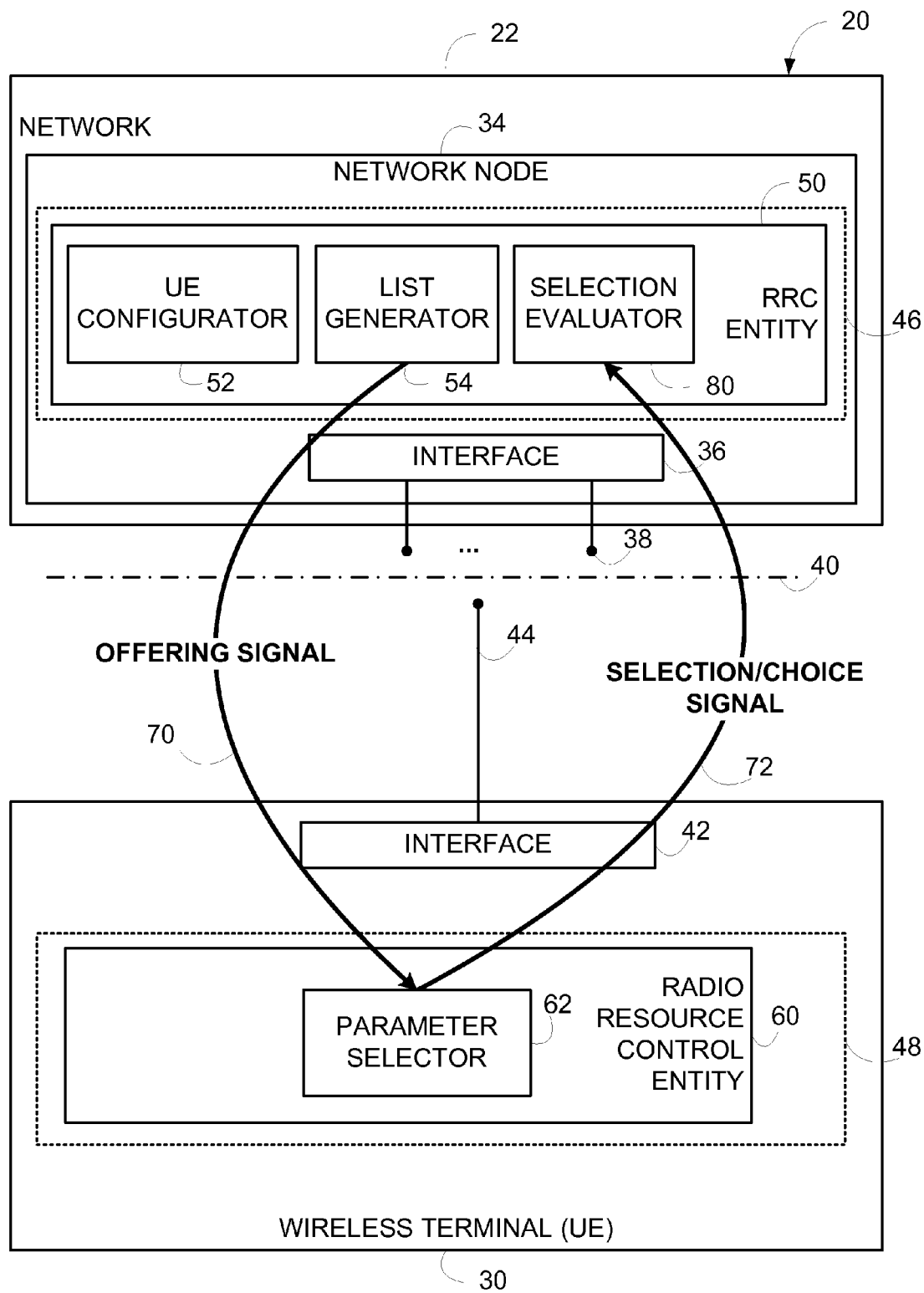

In one example embodiment illustrated in FIG. 5, upon the wireless terminal 30 providing a preferred configuration option (e.g., the preferred parameter configuration, which may be represented as an option or index as explained above) the network may evaluate the configuration information (e.g., selection/choice signal) as provided by the wireless terminal (UE). FIG. 5 shows the network node as comprising a selection evaluator 80.

In an example embodiment and mode selection evaluator 80 is configured to determine one or more of the following: (1) whether the network/node is able to configure the UE accordingly (e.g., whether the network has the required resources available (if the chosen configuration would result in a change)), and (2) whether the suggestion or choice made by the wireless terminal 30 matches/fits the observed traffic pattern (e.g. to compensate for bad UE implementations doing obviously the wrong choice and could thereby harm the network)).

Determination (1) by selector evaluator 80 may be appropriate, e.g., in a subframe pattern allocation situation/context in which the network may give several wireless terminals a same set of options and, for some reasons, all wireless terminals pick the same subframe pattern, which would be undesirable since some subframes would then be extremely loaded while other subframes may be essentially idle.

To make determination (2), the selector evaluator 80 may, e.g., check which radio bearers are currently established. If the wireless terminal 30 has (for example) an active VoIP bearer, it should not have a DRX configuration (e.g. with very long DRX cycles) that prevents the network from sending VoIP packets within the given delay constraints. The eNB may also have a deep packet inspection (DPI) functionality that monitors the traffic from/to a UE. As soon as the network discovers protocols or applications that require low latency, it could refrain from applying a very battery efficient DRX configuration. If the determination (2) occurs, the network may have to send an updated RRC Connection Reconfiguration to the UE.

Accordingly, in some example embodiments such as that of FIG. 5, it may be up to the network to accept or reject the preferred parameter configuration proposal of the wireless terminal 30. If the network accepts the proposed parameter combination option the network may perform a reconfiguration (e.g. RRC Connection Reconfiguration) of the wireless terminal in order to apply the chosen parameter values. In this regard, when an RRC connection is established with the wireless terminal 30 the network always provides the wireless terminal 30 with some initial or default parameters. Whenever the network wants to change any of the parameters, e.g. in response to a preferred parameter configuration provided by the wireless terminal, it initiates another such RRC Connection Reconfiguration procedure. The advantage of this example embodiment is that the actual configuration is under full control of the network, e.g., in line with the principle applied in the existing LTE specifications (3GPP TS 36.331).

In case that the parameters affected by the chosen parameter combination option specify only the network operation (e.g. state transitions mentioned above) the network may apply them without explicitly informing the wireless terminal.

Figure 6:
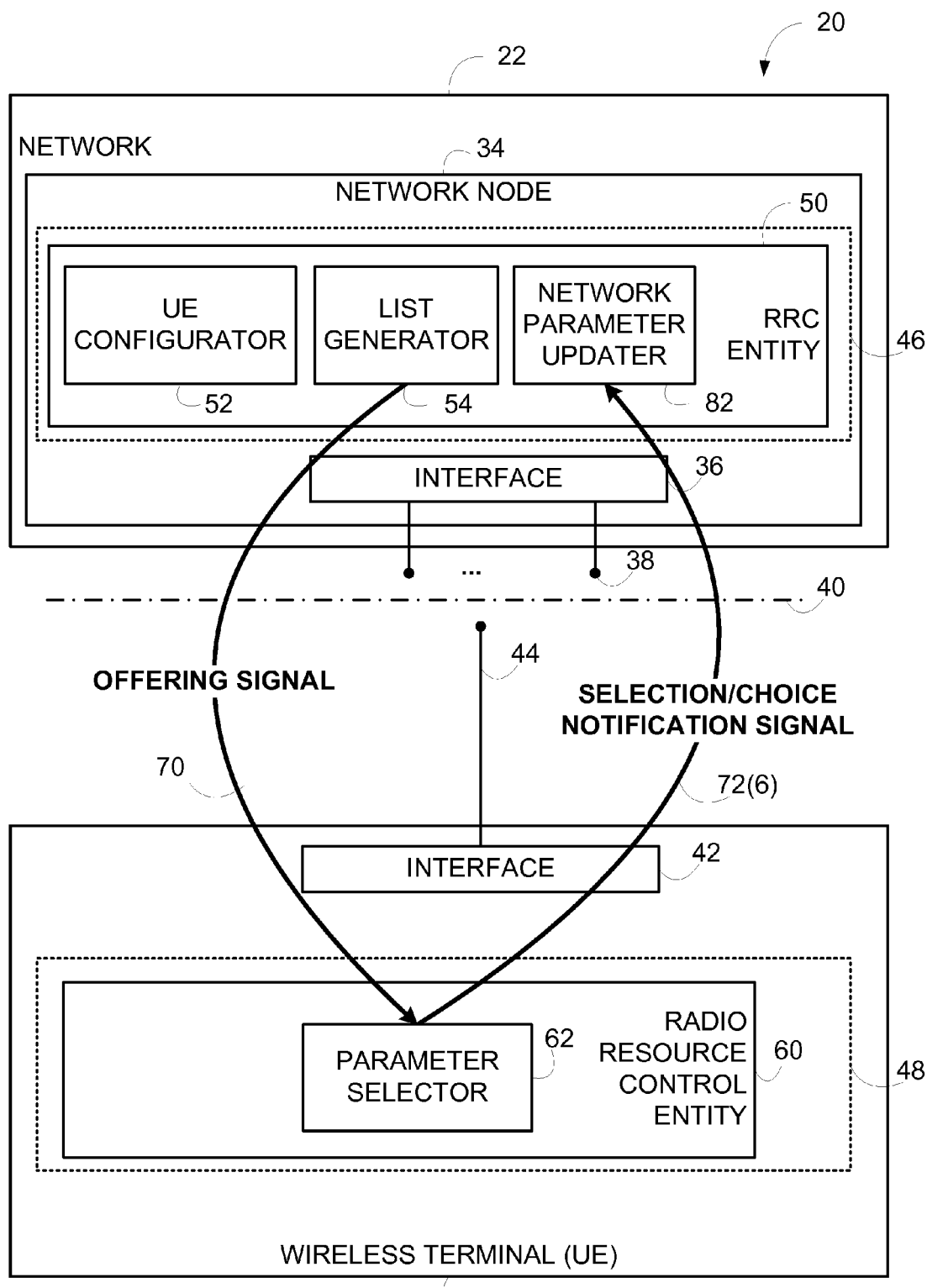

In another embodiment illustrated by way of example in FIG. 6, the wireless terminal 30 is allowed to autonomously select among the predefined configuration options, and the selection/choice message 72(6) to the network is merely a notification of which configuration the wireless terminal 30 selects to apply. When receiving from the wireless terminal 30 the notification of the parameter change, the network can update its parameters accordingly. FIG. 6 shows the network node as comprising network parameter updater functionality 82.

Figure 7:
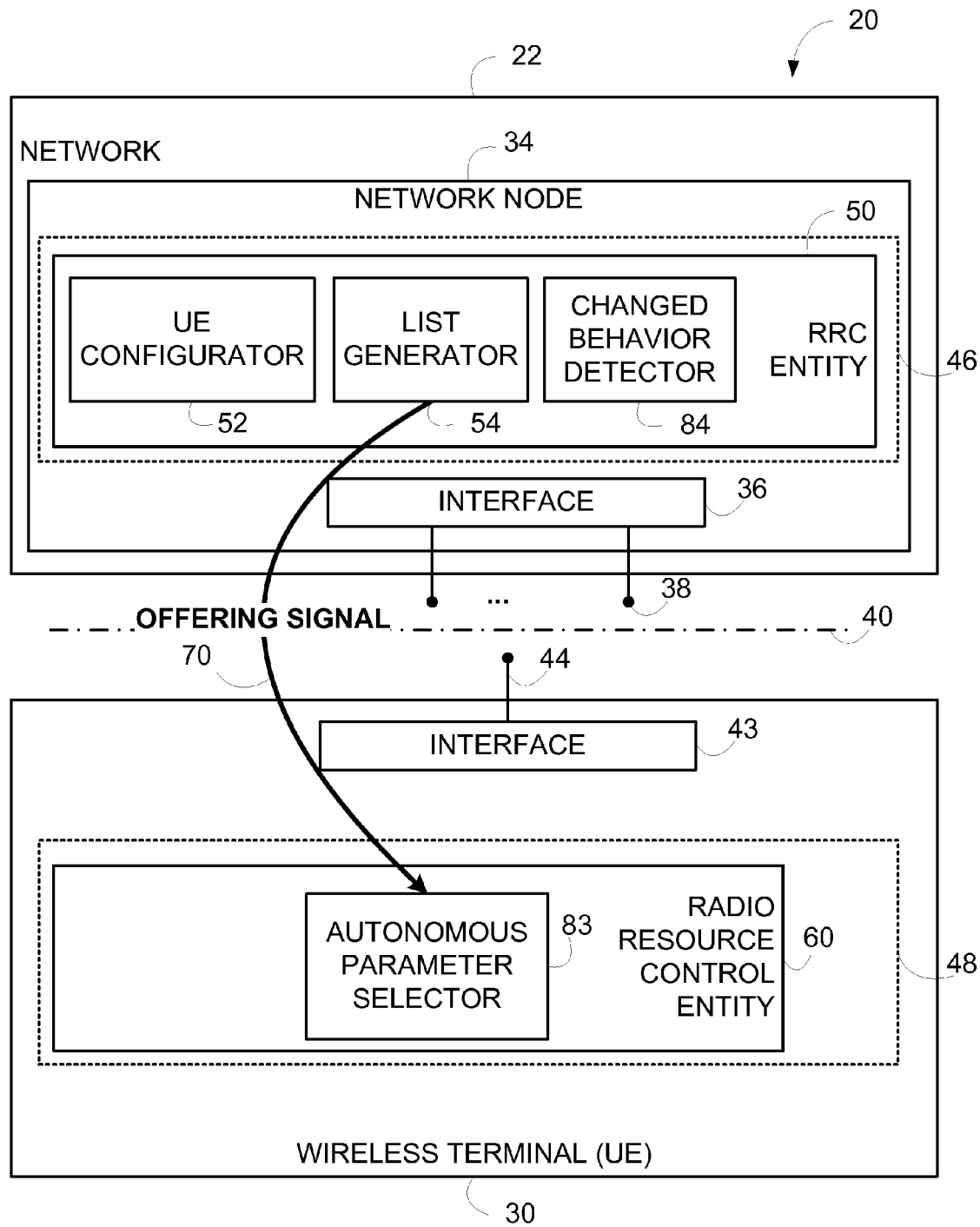

In another embodiment illustrated by way of example in FIG. 7, the wireless terminal (UE) may be allowed to autonomously apply one of the multitude of set parameter collections and to apply the parameters. In the FIG. 7 example embodiment, the network provides plural configuration options and, in response, the an autonomous parameter selector 83 wireless terminal 30 selects one of the plural configuration options and applies the parameters of the selected option (the preferred parameter configuration) without telling or asking the network. In other words, the wireless terminal 30 does not generate a selection/choice signal 72 in response to or in conjunction with the selection of the preferred parameter configuration. The network is thus left to discern or ascertain or detect by other means which configuration the wireless terminal (UE) has chosen or when it does not require any adaptation in the network behavior. In some example implementations the network can detect the changed configuration from the actions of the wireless terminal 30. FIG. 7 shows the network node as comprising a changed behavior detector 84 (e.g., UE changed behavior detector).

In the DRX example, the network can detect that the wireless terminal (UE) has changed the configuration because it does not perform transmissions associated to the DRX Active state such as transmission of CQI on PUCCH or SRS.

In an example embodiment the wireless terminal 30 may be given the option to report radio resource management (RRM) measurements (e.g. of other frequencies) periodically, e.g., every 500 ms. If the wireless terminal 30 wants to reduce the risk of radio link failure and potentially improve its throughput, the wireless terminal 30 should perform those measurements. Many wireless terminals will not, since measurement performance consumes more battery power but a laptop connected to a power supply may go for the potentially improved performance.

Figure 8:
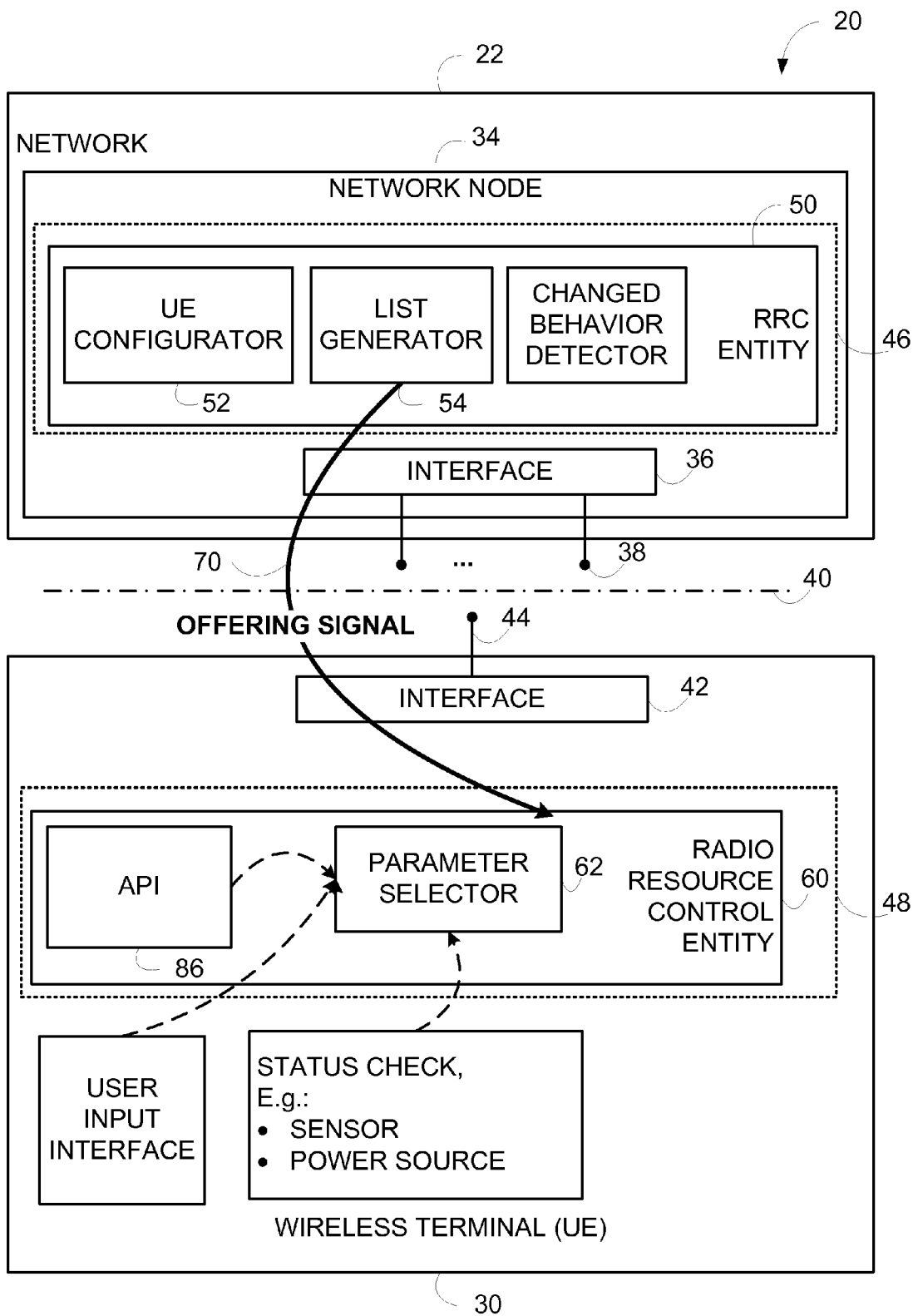

The method by which the wireless terminal 30 selects the most appropriate parameter configuration can be chosen independently of the core concept outlined above. It may be wireless terminal—implementation specific or specified in a corresponding standard. In one embodiment illustrated by way of example in FIG. 8, the operating system of the wireless terminal may evaluate the expected performance of any given parameter combination and associate with a human readable/understandable characteristic (e.g. "battery saver"; "high performance"). With this approach it could be left to the end-user of the device to choose the preferred behavior. Upon selection the wireless terminal 30 either applies the configuration or notifies the network about the preferred parameter combination as outlined above.

In another embodiment the wireless terminal 30 could implement an internal interface 86 (API, Application Programming Interface) which higher layer applications could use to indicate their requirements (high performance, low delay, . . . ). Based on this input the wireless terminal 30 may then choose the currently most appropriate parameter combination. Alternatively, the status of the user interface of the device such as, e.g., the display status (on/off), the status of sensors such as accelerometers or gyrometes, the type of power source (AC vs battery), the status of the battery, or any other means that can be used to infer the relative importance of latency versus battery efficiency may be used to determine the suitable configuration option.

Table 1 below shows the DRX-Config information element including all possible parameter values as defined in 3GPP TS 36.331, Rel-10. Allowing UEs to freely choose parameters for the contained variables (e.g. on Duration, drx-Inactivity-Timer, . . . ) would result in a very large number of possible combinations for which the network has not been tested and which it can therefore not apply without risking poor performance or even lack of network stability. According to some embodiments of the method described above, the network may therefore provide configuration options as indicated in Table 2.

Various entries in Table 2 are understood from 3GPP TS 36.331, and particularly a table therein entitled "MAC-Main-Config field descriptions". For example, "psf" signifies a value in number of PDCCH sub-frames; Value "psf1" corresponds to 1 PDCCH sub-frame; "psf2" corresponds to 2 PDCCH sub-frames; and so on; "sf" corresponds to a value in number of sub-frames.

Among the two parameter configuration options presented in Table 2, the wireless terminal 30 may choose the one fitting its (current) requirements (1=performance optimized; 2=battery optimized).

Figures 11A, 11B, 11C:
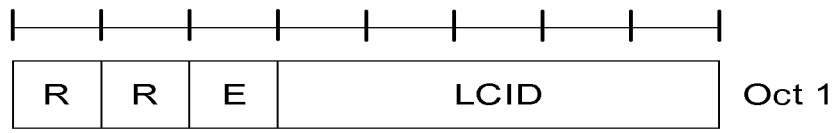
FIG. 11A is a diagrammatic view of an example data structure of a DRX Configuration Choice MAC Control Element.
FIG. 11B is a diagrammatic view of an example data structure of a generic MAC Control element.
FIG. 11C is a diagrammatic view of an example octet depicted by a MAC control element.

FIG. 11A illustrates an example data structure of a DRX Configuration Choice MAC Control Element by which the wireless terminal 30 informs the network about its preferred DRX configuration. The configuration index provided in the MAC Control Element refers to the options previously given by the network (see Table 2).

FIG. 11B shows an example data structure of a generic MAC Control element. The Parameter Set Index indicates which parameter group (e.g., 5=DRX, 7=subframe reservation) the control element refers to. The Parameter Set Index values could either be standardized or provided as part of the list of options (see Table 2). The configuration index refers to the Configuration Index shown in Table 2. In the 3GPP TS specifications (e.g. 36.321) these Control Elements typically depict the 8 bits per row (one octet), as shown in FIG. 11C.

The methods described herein or encompassed hereby allow the wireless terminal 30 to impact the network configuration while allowing the network to limit the possible choices (e.g., to selected and well tested parameter combinations). This allows the wireless terminal 30 to influence, e.g., its performance, battery consumption or latency. According to some embodiments the network remains in full control of the chosen parameter configuration so that it can override a UE's preference, e.g., based on instantaneous resource constraints or upon detecting faulty UE implementation.

The network may provide no or just one option thereby indicating to the wireless terminal that it has no choice but accepting the configuration in the RRC Connection Reconfiguration IE.

Figure 9:
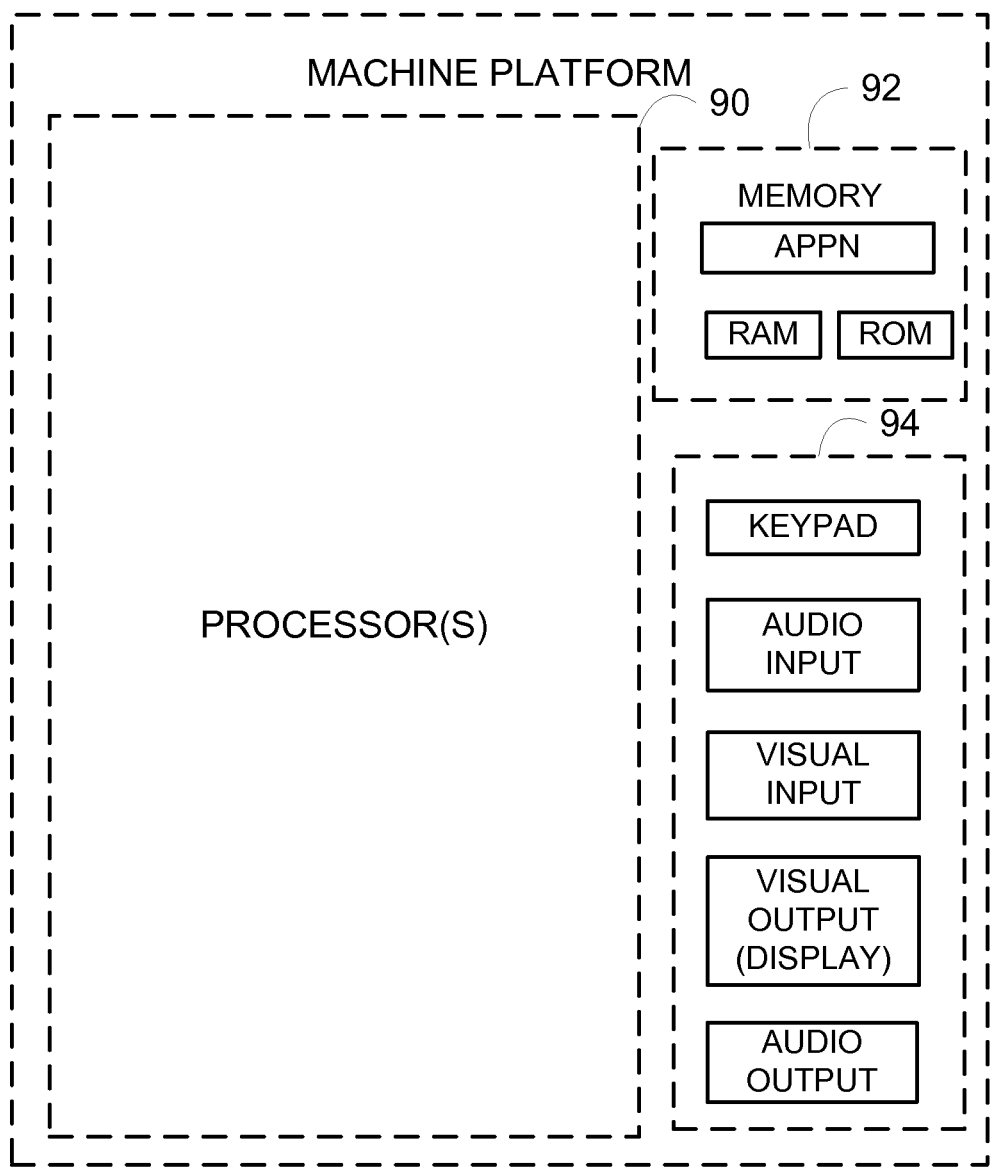
FIG. 9 is a diagrammatic view of a machine platform of a type which may comprise or be included in a network node or a wireless terminal (UE).

FIG. 9 illustrates in more detail a machine platform of the type that may comprise or be included in one or both of the network node and the wireless terminal (UE), and thus which may host the functionalities described herein for the respective node and terminal. In addition to a processor section 90 (which may comprise one or more processors or computers), the platform may comprise a memory section 92 (including a read only memory, a random access memory, program memory, among other types of memory such as cache memory) and an input/output section 94. The input/output section 94 of FIG. 9 happens to show a keypad, audio input, visual input, visual output (display) and audio output devices or units. It will be appreciated that other types of input/output devices may also be provided, and that there may be interfaces to one or more other nodes, devices, or entities.

The technology disclosed herein thus encompasses but is not limited to the following example embodiments:

Example Embodiment MS1

A method of operating a telecommunications system comprising:

a radio access network node offering plural parameter configurations to a wireless terminal over a radio interface;

the wireless terminal choosing a preferred parameter configuration from among the plural parameter configurations offered by the radio access network node.

Example Embodiment MS2

The method of Example Embodiment MS1, wherein each set of parameter configurations comprises a collection of parameter values.

Example Embodiment MS3

The method of Example Embodiment MS2, wherein each of said parameter configurations is associated with an index.

Example Embodiment MS4

The method of any of Example Embodiment MS1 through Example Embodiment MS3 inclusive, further comprising the radio access network node offering the plural parameter configurations in a radio resource control (RRC) Connection Reconfiguration message.

Example Embodiment MS5

The method of any of Example Embodiment MS1, through Example Embodiment MS3 inclusive, further comprising the radio access network node offering the plural parameter configurations as a list of discontinuous reception (DRX) configuration information elements, each discontinuous reception (DRX) configuration information element comprising one parameter value for each of the one or more corresponding discontinuous reception parameters defined for the configuration information element.

Example Embodiment MS6

The method of Example Embodiment MS1, further comprising the wireless terminal signaling the preferred parameter configuration to the radio access network node.

Example Embodiment MS7

The method of Example Embodiment MS1, further comprising the wireless terminal signaling the preferred parameter configuration to the radio access network node in the form of a parameter list.

Example Embodiment MS8

The method of Example Embodiment MS7, further comprising the wireless terminal signaling the preferred parameter configuration to the radio access network node in the form of an index to a configuration option.

Example Embodiment MS9

The method of any of Example Embodiment MS1 through Example Embodiment MS8 inclusive, wherein the wireless terminal provides the preferred parameter configuration in a radio resource control (RRC) Connection Reconfiguration Complete message.

Example Embodiment MS10

The method of any of Example Embodiment MS1 through Example Embodiment MS9 inclusive, wherein the wireless terminal provides the preferred parameter configuration in a control element.

Example Embodiment MS11

The method of Example Embodiment MS10, further comprising limiting repeated transmission of said control element by means of a timer.

Example Embodiment MS12

The method of Example Embodiment MS1, further comprising the radio access network node evaluating the preferred parameter configuration chosen by the wireless terminal.

Example Embodiment MS13

The method of Example Embodiment MS12, further comprising the radio access network node evaluating the preferred parameter configuration chosen by the wireless terminal in accordance with at least one of the following:
whether the radio access network node is able to configure the wireless terminal with the preferred parameter configuration; and,
whether the preferred parameter configuration is suitable for an observed traffic pattern.

Example Embodiment MS14

The method of Example Embodiment MS1 further comprising:
the wireless terminal providing a notification to the radio access network node of the preferred parameter configuration; and
the radio access network node updating configuration parameters for the wireless terminal in accordance with the notification.

Example Embodiment MN1

A method of operating a radio access network node of a telecommunications system, the method comprising:
the radio access network node offering plural parameter configurations to a wireless terminal over a radio interface;
the radio access network node thereafter communicating with the wireless terminal based on a preferred parameter configuration chosen by the wireless terminal from among the plural parameter configurations offered by the radio access network node.

Example Embodiment MN2

The method of Example Embodiment MN1, wherein each set of parameter configurations comprises a collection of parameter values.

Example Embodiment MN3

The method of Example Embodiment MN2, wherein each of said parameter configurations is associated with an index.

Example Embodiment MN4

The method Example Embodiment MN1, further comprising the radio access network node offering the plural parameter configurations in a radio resource control (RRC) Connection Reconfiguration message.

Example Embodiment MN5

The method of Example Embodiment MN1, further comprising the radio access network node offering the plural parameter configurations as a list of discontinuous reception (DRX) configuration information elements, each discontinuous reception (DRX) configuration information element comprising one parameter value for each of the one or more corresponding discontinuous reception parameters defined for the configuration information element.

Example Embodiment MN6

The method of Example Embodiment MN1, further comprising the radio access network receiving signaling of the preferred parameter configuration from the wireless terminal.

Example Embodiment MN7

The method of Example Embodiment MN1, further comprising the radio access network receiving signaling of the preferred parameter configuration from the wireless terminal in the form of a parameter list.

Example Embodiment MN8

The method of Example Embodiment MN7, further comprising the radio access network receiving signaling of the preferred parameter configuration to the radio access network node in the form of an index to a configuration option.

Example Embodiment MN9

The method of Example Embodiment MN1, further comprising the radio access network node evaluating the preferred parameter configuration chosen by the wireless terminal.

Example Embodiment MN10

The method of Example Embodiment MN1, further comprising the radio access network node evaluating the preferred parameter configuration chosen by the wireless terminal in accordance with at least one of the following:
whether the radio access network node is able to configure the wireless terminal with the preferred parameter configuration; and,
whether the preferred parameter configuration is suitable for an observed traffic pattern.

Example Embodiment MN11

The method of Example Embodiment MN1, further comprising the radio access network node updating configuration parameters for the wireless terminal in accordance a notification of the preferred parameter configuration received from the wireless terminal.

Example Embodiment AN1

A radio access network node of a telecommunications system which communicates over a radio interface with a wireless terminal, the node comprising:
an entity configured to generate plural parameter configurations to offer to a wireless terminal over the radio interface;
a communications interface through which the plural parameter configurations are offered to the wireless terminal.

Example Embodiment AN2

The apparatus of Example Embodiment AN1, wherein each set of parameter configurations comprises a collection of parameter values.

Example Embodiment AN3

The apparatus of Example Embodiment AN2, wherein each of said parameter configurations is associated with an index.

Example Embodiment AN4

The apparatus of Example Embodiment AN1, wherein the entity is configured to offer the plural parameter configurations in a radio resource control (RRC) Connection Reconfiguration message.

Example Embodiment AN5

The apparatus of Example Embodiment AN1, wherein the entity is configured to offer the plural parameter configurations as a list of discontinuous reception (DRX) configuration information elements, each discontinuous reception (DRX) configuration information element comprising one parameter value for each of the one or more corresponding discontinuous reception parameters defined for the configuration information element.

Example Embodiment AN6

The apparatus of Example Embodiment AN1, wherein the entity is further configured to receive signaling of the preferred parameter configuration from the wireless terminal.

Example Embodiment AN7

The apparatus of Example Embodiment AN1, wherein the entity is further configured to receive signaling of the preferred parameter configuration from the wireless terminal in the form of a parameter list.

Example Embodiment AN8

The apparatus of Example Embodiment AN7, wherein the entity is further configured to receive signaling of the preferred parameter configuration in the form of an index to a configuration option.

Example Embodiment AN9

The apparatus of Example Embodiment AN1, wherein the entity is further configured to evaluate the preferred parameter configuration chosen by the wireless terminal.

Example Embodiment AN10

The apparatus of Example Embodiment AN1, wherein the entity is further configured to evaluate the preferred parameter configuration chosen by the wireless terminal in accordance with at least one of the following:
whether the radio access network node is able to configure the wireless terminal with the preferred parameter configuration; and,
whether the preferred parameter configuration is suitable for an observed traffic pattern.

Example Embodiment AN11

The apparatus of Example Embodiment AN1, wherein the entity is further configured to update configuration parameters for the wireless terminal in accordance a notification of the preferred parameter configuration received from the wireless terminal.

Example Embodiment MU1

A method of operating a wireless terminal which communications with a radio access node over a radio interface, the method comprising:
the wireless terminal receiving plural parameter configurations offered to a wireless terminal over the radio interface;
the wireless terminal choosing a preferred parameter configuration from among the plural parameter configurations offered by the radio access network node.

Example Embodiment MU2

The method of Example Embodiment MU1, wherein each set of parameter configurations comprises a collection of parameter values.

Example Embodiment MU3

The method of Example Embodiment MU2, wherein each of said parameter configurations is associated with an index.

Example Embodiment MU4

The method of Example Embodiment MU1, further comprising the wireless terminal receiving the plural parameter configurations offered by the radio access network node in a radio resource control (RRC) Connection Reconfiguration message.

Example Embodiment MU5

The method of Example Embodiment MU1, further comprising the wireless terminal receiving the plural parameter configurations as a list of discontinuous reception (DRX) configuration information elements, each discontinuous reception (DRX) configuration information element comprising one parameter value for each of the one or more corresponding discontinuous reception parameters defined for the configuration information element.

Example Embodiment MU6

The method of Example Embodiment MU1, further comprising the wireless terminal signaling the preferred parameter configuration to the radio access network node.

Example Embodiment MU7

The method of Example Embodiment MU1, further comprising the wireless terminal signaling the preferred parameter configuration to the radio access network node in the form of a parameter list.

Example Embodiment MU8

The method of Example Embodiment MU7, further comprising the wireless terminal signaling the preferred parameter configuration to the radio access network node in the form of an index to a configuration option.

Example Embodiment MU9

The method of Example Embodiment MU1, further comprising the wireless terminal providing the preferred parameter configuration in a radio resource control (RRC) Connection Reconfiguration Complete message.

Example Embodiment MU10

The method of Example Embodiment MU1, further comprising the wireless terminal providing the preferred parameter configuration in a control element.

Example Embodiment MU11

The method of Example Embodiment MU10, further comprising limiting repeated transmission of said control element by means of a timer.

Example Embodiment AU1

A wireless terminal comprising:
a communication interface through which the wireless terminal receives over a radio interface plural parameter configurations offered by a radio access network node;
an entity configured to choose a preferred parameter configuration from among the plural parameter configurations offered by the radio access network node.

Example Embodiment AU2

The wireless terminal of Example Embodiment AU1, wherein each set of parameter configurations comprises a collection of parameter values.

Example Embodiment AU3

The wireless terminal of Example Embodiment AU1, wherein the plural parameter configurations comprises a list of discontinuous reception (DRX) configuration information elements, each discontinuous reception (DRX) configuration information element comprising one parameter value for each of the one or more corresponding discontinuous reception parameters defined for the configuration information element.

Example Embodiment AU4

The wireless terminal of Example Embodiment AU1, wherein the entity is configured to signal the preferred parameter configuration to the radio access network node.
Embodiment AU1, wherein the entity is configured to signal the preferred parameter configuration to the radio access network node in the form of a parameter list.

Example Embodiment AU6

The wireless terminal of Example Embodiment AU1, wherein the entity is configured to signal the preferred parameter configuration to the radio access network node in the form of an index to a configuration option.

Although the description above contains many specificities, these should not be construed as limiting the scope of the technology disclosed herein but as merely providing illustrations of some of the presently preferred embodiments of the disclosed technology. Thus the scope of this technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

DRX-Config IE including all possible parameter values as defined in 3GPP TS 36.331, Rel-10

```
DRX-Config ::=              CHOICE {
    release                     NULL,
    setup                       SEQUENCE {
        onDurationTimer             ENUMERATED {
                                        psf1, psf2, psf3, psf4, psf5, psf6,
                                        psf8, psf10, psf20, psf30, psf40,
                                        psf50, psf60, psf80, psf100,
                                        psf200},
```

TABLE 1-continued

DRX-Config IE including all possible parameter
values as defined in 3GPP TS 36.331, Rel-10

| | |
|---|---|
| drx-InactivityTimer | ENUMERATED { psf1, psf2, psf3, psf4, psf5, psf6, psf8, psf10, psf20, psf30, psf40, psf50, psf60, psf80, psf100, psf200, psf300, psf500, psf750, psf1280, psf1920, psf2560, spare10, spare9, spare8, spare7, spare6, spare5, spare4, spare3, spare2, spare1}, |
| drx-RetransmissionTimer | ENUMERATED { psf1, psf2, psf4, psf6, psf8, psf16, psf24, psf33}, |
| longDRX-CycleStartOffset | CHOICE { |
| sf10 | INTEGER(0..9), |
| sf20 | INTEGER(0..19), |
| sf32 | INTEGER(0..31), |
| sf40 | INTEGER(0..39), |
| sf64 | INTEGER(0..63), |
| sf80 | INTEGER(0..79), |
| sf128 | INTEGER(0..127), |
| sf160 | INTEGER(0..159), |
| sf256 | INTEGER(0..255), |
| sf320 | INTEGER(0..319), |
| sf512 | INTEGER(0..511), |
| sf640 | INTEGER(0..639), |
| sf1024 | INTEGER(0..1023), |
| sf1280 | INTEGER(0..1279), |
| sf2048 | INTEGER(0..2047), |
| sf2560 | INTEGER(0..2559) |
| }, | |
| shortDRX | SEQUENCE { |
| shortDRX-Cycle | ENUMERATED { sf2, sf5, sf8, sf10, sf16, sf20, sf32, sf40, sf64, sf80, sf128, sf160, sf256, sf320, sf512, sf640}, |
| drxShortCycleTimer | INTEGER (1..16) |
| } OPTIONAL | -- Need OR |
| } | |

TABLE 2

Example data structure with parameter configuration options
provided by the network to the UE.

| | Parameter Set Index 3 | |
|---|---|---|
| | Option 1 (performance) | Option 2 (battery) |
| Configuration Index | 1 | 2 |
| onDurationTimer | psf10 | psf100 |
| drx-InactivityTimer | psf100 | psf5 |
| Drx-RetransmissionTimer | psf8 | psf1 |
| shortDRX-Cycle | — | sf20 |
| drxShortCycleTimer | — | 10 |

What is claimed is:

1. A radio access network node of a telecommunications system which communicates over a radio interface with a wireless terminal, the radio access network node comprising:
an entity configured to generate plural parameter configurations to offer to the wireless terminal over the radio interface; and
a communications interface through which the plural parameter configurations are offered to the wireless terminal,
wherein the entity is further configured to
receive signaling of a preferred parameter configuration from the wireless terminal as chosen from the plural parameter configurations by the wireless terminal, and
offer the plural parameter configurations are received as a list of discontinuous reception (DRX) configuration information elements, each discontinuous reception (DRX) configuration information element comprising one parameter value for each of one or more corresponding discontinuous reception parameters defined for the configuration information element.

2. The radio access network node of claim 1, wherein each of the parameter configurations comprises a collection of parameter values.

3. The radio access network node of claim 2, wherein each of the parameter configurations is associated with an index.

4. The radio access network node of claim 1, wherein the entity is configured to offer the plural parameter configurations in a radio resource control (RRC) Connection Reconfiguration message.

5. The radio access network node of claim 1, wherein the entity is further configured to receive the signaling of the preferred parameter configuration from the wireless terminal in a form of a parameter list.

6. The radio access network node of claim 5, wherein the entity is further configured to receive the signaling of the preferred parameter configuration in a form of an index identifying the preferred parameter configuration among the plural parameter configurations offered by the radio access network node.

7. The radio access network node of claim 1, wherein the entity is further configured to evaluate the preferred parameter configuration chosen by the wireless terminal.

8. The radio access network node of claim 1, wherein the entity is further configured to evaluate the preferred parameter configuration chosen by the wireless terminal in accordance with at least one of the following:
- whether the radio access network node is able to configure the wireless terminal with the preferred parameter configuration, and
- whether the preferred parameter configuration is suitable for an observed traffic pattern.

9. The radio access network node of claim 1, wherein the entity is further configured to update configuration parameters for the wireless terminal in accordance with a notification of the preferred parameter configuration received from the wireless terminal.

10. A method of operating a wireless terminal which communicates with a radio access network node over a radio interface, the method comprising:
- the wireless terminal receiving plural parameter configurations offered to the wireless terminal over the radio interface; and
- the wireless terminal choosing a preferred parameter configuration from among the plural parameter configurations offered by the radio access network node,
- wherein the plural parameter configurations are received as a list of discontinuous reception (DRX) configuration information elements, each discontinuous reception (DRX) configuration information element comprising one parameter value for each of one or more corresponding discontinuous reception parameters defined for the configuration information element.

11. The method of claim 10, wherein each of the parameter configurations comprises a collection of parameter values.

12. The method of claim 11, wherein each of the parameter configurations is associated with an index.

13. The method of claim 10, further comprising the wireless terminal receiving the plural parameter configurations offered by the radio access network node in a radio resource control (RRC) Connection Reconfiguration message.

14. The method of claim 10, further comprising the wireless terminal signaling the preferred parameter configuration to the radio access network node.

15. The method of claim 10, further comprising the wireless terminal signaling the preferred parameter configuration to the radio access network node in a form of a parameter list.

16. The method of claim 15, further comprising the wireless terminal signaling the preferred parameter configuration to the radio access network node in a form of an index identifying the preferred parameter configuration among the plural parameter configurations offered by the radio access network node.

17. The method of claim 10, further comprising the wireless terminal providing the preferred parameter configuration in a radio resource control (RRC) Connection Reconfiguration Complete message.

18. The method of claim 10, further comprising the wireless terminal providing the preferred parameter configuration in a medium access (MAC) control element.

19. The method of claim 18, further comprising limiting repeated transmission of the MAC control element through a timer.

20. A wireless terminal, comprising:
- a communication interface through which the wireless terminal receives over a radio interface plural parameter configurations offered by a radio access network node; and
- an entity configured to choose a preferred parameter configuration from among the plural parameter configurations offered by the radio access network node,
- wherein the plural parameter configurations comprise a list of discontinuous reception (DRX) configuration information elements, each discontinuous reception (DRX) configuration information element comprising one parameter value for each of one or more corresponding discontinuous reception parameters defined for the configuration information element.

21. The wireless terminal of claim 20, wherein each of the parameter configurations comprises a collection of parameter values.

22. The wireless terminal of claim 20, wherein the entity is configured to signal the preferred parameter configuration to the radio access network node.

23. The wireless terminal of claim 20, wherein the entity is configured to signal the preferred parameter configuration to the radio access network node in a form of a parameter list.

24. The wireless terminal of claim 20, wherein the entity is configured to signal the preferred parameter configuration to the radio access network node in a form of an index identifying the preferred parameter configuration among the plural parameter configurations offered by the radio access network node.

* * * * *